United States Patent
Purdy

(10) Patent No.: US 8,554,770 B2
(45) Date of Patent: Oct. 8, 2013

(54) PROFILE CONSTRUCTION USING LOCATION-BASED AGGREGATE PROFILE INFORMATION

(75) Inventor: Sean T. Purdy, Durham, NC (US)

(73) Assignee: Waldeck Technology, LLC, Portsmouth, NH (US)

(*) Notice: Subject to any disclaimer, the term of this patent is extended or adjusted under 35 U.S.C. 154(b) by 294 days.

(21) Appl. No.: 12/764,150

(22) Filed: Apr. 21, 2010

(65) Prior Publication Data

US 2012/0047184 A1    Feb. 23, 2012

Related U.S. Application Data

(60) Provisional application No. 61/173,625, filed on Apr. 29, 2009.

(51) Int. Cl.
*G06F 17/30* (2006.01)
(52) U.S. Cl.
USPC .... 707/736; 707/802; 707/E17.06; 455/456.1
(58) Field of Classification Search
None
See application file for complete search history.

(56) References Cited

U.S. PATENT DOCUMENTS

| | | | |
|---|---|---|---|
| 5,539,232 A | 7/1996 | Nakanishi et al. | |
| 5,890,152 A | 3/1999 | Rapaport et al. | |
| 6,204,844 B1 | 3/2001 | Fumarolo et al. | |
| 6,240,069 B1 | 5/2001 | Alperovich et al. | |
| 6,308,175 B1 * | 10/2001 | Lang et al. | 707/608 |
| 6,385,619 B1 | 5/2002 | Eichstaedt et al. | |
| 6,401,051 B1 | 6/2002 | Merriam | |
| 6,490,587 B2 | 12/2002 | Easty et al. | |
| 6,529,136 B2 | 3/2003 | Cao et al. | |
| 6,611,842 B1 | 8/2003 | Brown | |
| 6,701,362 B1 | 3/2004 | Subramonian et al. | |

(Continued)

FOREIGN PATENT DOCUMENTS

| | | |
|---|---|---|
| EP | 1463354 | 12/2005 |
| WO | WO 2008/000046 | 1/2008 |
| WO | 2008/147252 A1 | 12/2008 |
| WO | WO 2009/039350 | 3/2009 |

OTHER PUBLICATIONS

Abstract, Yu et al., "Recommendation System Using Location-Based Ontology on Wireless Internet: An Example of Collective Intelligence by Using 'Mashup' Applications," Expert Systems with Applications, vol. 36, Issue 9, pp. 11675-11681, Nov. 2009, abstract printed May 13, 2009, 3 pages.

(Continued)

*Primary Examiner* — Fred I Ehichioya
*Assistant Examiner* — Michelle Owyang

(57) ABSTRACT

Systems and methods are disclosed for creating a user profile for a subject user based on historical aggregate profile data for locations at which the subject user was previously located. In one embodiment, one or more location and time period pairs are determined for the subject user. Each location and time period pair defines a previous location of the subject user and a time period during which the subject user was at the previous location. Historical aggregate profile data is obtained for the location and time period pairs. For each location and time period pair, the historical aggregate profile data is generally an aggregation of user profiles of a number of users relevant to the location and time period pair. A user profile for the subject user is then created based on the historical aggregate profile data for the one or more location and time period pairs.

26 Claims, 21 Drawing Sheets

(56) References Cited

U.S. PATENT DOCUMENTS

| | | |
|---|---|---|
| 6,708,172 B1 | 3/2004 | Wong et al. |
| 6,819,919 B1 | 11/2004 | Tanaka |
| 6,968,179 B1 | 11/2005 | De Vries |
| 6,987,885 B2 | 1/2006 | Gonzalez-Banos et al. |
| 7,035,863 B2 | 4/2006 | Kurapati et al. |
| 7,116,985 B2 | 10/2006 | Wilson et al. |
| 7,123,918 B1 | 10/2006 | Goodman |
| 7,158,798 B2 | 1/2007 | Lee et al. |
| 7,162,471 B1 | 1/2007 | Knight et al. |
| 7,236,739 B2 | 6/2007 | Chang |
| 7,247,024 B2 | 7/2007 | Bright et al. |
| 7,272,357 B2 | 9/2007 | Nishiga et al. |
| 7,280,822 B2 | 10/2007 | Fraccaroli |
| 7,398,081 B2 | 7/2008 | Moran |
| 7,403,990 B2 | 7/2008 | Nishiyama et al. |
| 7,418,268 B1 | 8/2008 | Cabano et al. |
| 7,423,580 B2 | 9/2008 | Markhovsky et al. |
| 7,444,655 B2 | 10/2008 | Sardera |
| 7,509,131 B2 | 3/2009 | Krumm et al. |
| 7,558,404 B2 | 7/2009 | Ma et al. |
| 7,620,404 B2 | 11/2009 | Chesnais et al. |
| 7,680,959 B2 | 3/2010 | Svendsen |
| 7,685,192 B1 | 3/2010 | Scofield et al. |
| 7,787,886 B2 | 8/2010 | Markhovsky et al. |
| 7,844,283 B2 * | 11/2010 | Riise et al. ................ 455/456.3 |
| 7,849,082 B2 | 12/2010 | Westphal |
| 8,010,601 B2 | 8/2011 | Jennings et al. |
| 8,140,515 B2 * | 3/2012 | Pradhan et al. ............. 707/711 |
| 8,208,943 B2 | 6/2012 | Petersen et al. |
| 2001/0013009 A1 | 8/2001 | Greening et al. |
| 2001/0036224 A1 | 11/2001 | Demello et al. |
| 2002/0010628 A1 | 1/2002 | Burns |
| 2002/0049690 A1 | 4/2002 | Takano |
| 2002/0086676 A1 | 7/2002 | Hendrey et al. |
| 2002/0087335 A1 | 7/2002 | Meyers et al. |
| 2002/0087632 A1 | 7/2002 | Keskar |
| 2003/0005056 A1 | 1/2003 | Yamamoto et al. |
| 2004/0009750 A1 | 1/2004 | Beros et al. |
| 2004/0025185 A1 | 2/2004 | Goci et al. |
| 2004/0098386 A1 | 5/2004 | Thint et al. |
| 2004/0098744 A1 | 5/2004 | Gutta |
| 2004/0181668 A1 | 9/2004 | Blew et al. |
| 2004/0192331 A1 | 9/2004 | Gorday et al. |
| 2005/0038876 A1 | 2/2005 | Chaudhuri |
| 2005/0070298 A1 | 3/2005 | Caspi et al. |
| 2005/0113123 A1 | 5/2005 | Torvinen |
| 2005/0130634 A1 | 6/2005 | Godfrey |
| 2005/0174975 A1 | 8/2005 | Mgrdechian et al. |
| 2005/0210387 A1 | 9/2005 | Alagappan et al. |
| 2005/0231425 A1 | 10/2005 | Coleman et al. |
| 2005/0278317 A1 | 12/2005 | Gross et al. |
| 2006/0046743 A1 | 3/2006 | Mirho |
| 2006/0123080 A1 | 6/2006 | Baudino et al. |
| 2006/0123462 A1 | 6/2006 | Lunt et al. |
| 2006/0161599 A1 | 7/2006 | Rosen |
| 2006/0166679 A1 | 7/2006 | Karaoguz et al. |
| 2006/0195361 A1 | 8/2006 | Rosenberg |
| 2006/0229058 A1 | 10/2006 | Rosenberg |
| 2006/0256959 A1 | 11/2006 | Hymes |
| 2006/0270419 A1 | 11/2006 | Crowley et al. |
| 2006/0282303 A1 | 12/2006 | Hale et al. |
| 2007/0005419 A1 * | 1/2007 | Horvitz et al. ................ 705/14 |
| 2007/0015518 A1 | 1/2007 | Winter et al. |
| 2007/0030824 A1 | 2/2007 | Ribaudo et al. |
| 2007/0032242 A1 | 2/2007 | Goodman |
| 2007/0075898 A1 | 4/2007 | Markhovsky et al. |
| 2007/0118509 A1 | 5/2007 | Svendsen |
| 2007/0118564 A1 | 5/2007 | Qi et al. |
| 2007/0135138 A1 | 6/2007 | Brown et al. |
| 2007/0142065 A1 | 6/2007 | Richey et al. |
| 2007/0149214 A1 | 6/2007 | Walsh et al. |
| 2007/0150444 A1 | 6/2007 | Chesnais et al. |
| 2007/0155396 A1 | 7/2007 | Kim et al. |
| 2007/0156664 A1 | 7/2007 | Norton et al. |
| 2007/0162328 A1 | 7/2007 | Reich |
| 2007/0167174 A1 | 7/2007 | Halcrow et al. |
| 2007/0174243 A1 | 7/2007 | Fritz |
| 2007/0179792 A1 | 8/2007 | Kramer |
| 2007/0179863 A1 | 8/2007 | Stoll |
| 2007/0203644 A1 | 8/2007 | Thota et al. |
| 2007/0210937 A1 | 9/2007 | Smith et al. |
| 2007/0218900 A1 | 9/2007 | Abhyanker |
| 2007/0233671 A1 * | 10/2007 | Oztekin et al. .................... 707/5 |
| 2007/0255785 A1 | 11/2007 | Hayashi et al. |
| 2007/0282621 A1 | 12/2007 | Altman et al. |
| 2007/0290832 A1 | 12/2007 | Kalinichenko et al. |
| 2008/0000964 A1 | 1/2008 | Flake et al. |
| 2008/0016018 A1 | 1/2008 | Malik |
| 2008/0016205 A1 | 1/2008 | Svendsen |
| 2008/0076418 A1 | 3/2008 | Beyer, Jr. |
| 2008/0086741 A1 | 4/2008 | Feldman et al. |
| 2008/0097999 A1 | 4/2008 | Horan |
| 2008/0106599 A1 | 5/2008 | Liu et al. |
| 2008/0113674 A1 | 5/2008 | Baig |
| 2008/0118106 A1 | 5/2008 | Kilambi et al. |
| 2008/0126113 A1 | 5/2008 | Manning et al. |
| 2008/0140650 A1 | 6/2008 | Stackpole |
| 2008/0146250 A1 | 6/2008 | Aaron |
| 2008/0155080 A1 | 6/2008 | Marlow et al. |
| 2008/0182563 A1 | 7/2008 | Wugofski et al. |
| 2008/0182591 A1 | 7/2008 | Krikorian |
| 2008/0188261 A1 | 8/2008 | Arnone |
| 2008/0222295 A1 | 9/2008 | Robinson et al. |
| 2008/0227473 A1 | 9/2008 | Haney |
| 2008/0242317 A1 | 10/2008 | Abhyanker |
| 2008/0250312 A1 | 10/2008 | Curtis |
| 2008/0288355 A1 | 11/2008 | Rosen |
| 2008/0301166 A1 | 12/2008 | Sugiyama et al. |
| 2008/0306826 A1 | 12/2008 | Kramer et al. |
| 2008/0318597 A1 | 12/2008 | Berns et al. |
| 2009/0023410 A1 | 1/2009 | Ghosh |
| 2009/0024315 A1 | 1/2009 | Scheibe |
| 2009/0030999 A1 | 1/2009 | Gatzke et al. |
| 2009/0037355 A1 | 2/2009 | Brave et al. |
| 2009/0047972 A1 | 2/2009 | Neeraj |
| 2009/0048977 A1 * | 2/2009 | Aggarwal et al. ............... 705/50 |
| 2009/0076894 A1 | 3/2009 | Bates et al. |
| 2009/0082038 A1 | 3/2009 | McKiou et al. |
| 2009/0106040 A1 | 4/2009 | Jones |
| 2009/0112467 A1 | 4/2009 | Jiang et al. |
| 2009/0112807 A1 * | 4/2009 | Bahn ................................ 707/3 |
| 2009/0115570 A1 | 5/2009 | Cusack, Jr. |
| 2009/0115617 A1 | 5/2009 | Sano et al. |
| 2009/0132652 A1 | 5/2009 | Athale et al. |
| 2009/0138346 A1 | 5/2009 | Kalaboukis et al. |
| 2009/0144211 A1 | 6/2009 | O'Sullivan et al. |
| 2009/0150501 A1 | 6/2009 | Davis et al. |
| 2009/0164431 A1 | 6/2009 | Zivkovic et al. |
| 2009/0164459 A1 | 6/2009 | Jennings et al. |
| 2009/0201896 A1 | 8/2009 | Davis et al. |
| 2009/0210480 A1 | 8/2009 | Sivasubramaniam et al. |
| 2009/0287783 A1 | 11/2009 | Beare et al. |
| 2009/0307263 A1 * | 12/2009 | Skibiski et al. ............ 707/103 R |
| 2010/0004857 A1 | 1/2010 | Pereira et al. |
| 2010/0017261 A1 | 1/2010 | Evans et al. |
| 2010/0020776 A1 | 1/2010 | Youssef et al. |
| 2010/0023338 A1 | 1/2010 | Petronelli et al. |
| 2010/0076968 A1 * | 3/2010 | Boyns et al. ................... 707/732 |
| 2010/0130226 A1 | 5/2010 | Arrasvuori et al. |
| 2010/0197219 A1 | 8/2010 | Issa et al. |
| 2010/0197318 A1 | 8/2010 | Petersen et al. |
| 2010/0197319 A1 | 8/2010 | Petersen et al. |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0205211 A1 | 8/2010 | Ghosh |
| 2011/0136506 A1 | 6/2011 | Stewart |
| 2012/0041983 A1 | 2/2012 | Jennings |
| 2012/0047143 A1 | 2/2012 | Petersen et al. |
| 2012/0047152 A1 | 2/2012 | Purdy |
| 2012/0066231 A1 | 3/2012 | Petersen et al. |
| 2012/0072495 A1 | 3/2012 | Jennings et al. |

(56) References Cited

U.S. PATENT DOCUMENTS

OTHER PUBLICATIONS

Agostini, A. et al., "Towards Highly Adaptive Services for Mobile Computing," In Proceedings of IFIP TC8 Working Conference on Mobile Information Systems (MOBIS), Sep. 15-17, 2004, Oslo, Norway, Springer, 2004, pp. 121-134, 14 pages.
"Final: OpenID Attribute Exchange 1.0—Final," at <http://openid.net/specs/openid-attribute-exchange-1_0.html>, Dec. 5, 2007, printed May 11, 2012, 11 pages.
"Fire Eagle," at <http://fireeagle.yahoo.net>, copyright 2007-2011, Yahoo! Inc., printed Apr. 28, 2011, 2 pages.
Megliola, M. et al., "Integrating Agent and Wireless Technologies for Location-Based Services in Cultural Heritage," Digital Cultural Heritage—Essential for Tourism, 2nd EVA Conference, Vienna, Austria, Aug. 25-28, 2008, 9 pages.
"OpenID Foundation website," at <http://openid.net>, copyright 2006-2011, OpenID Foundation, printed Apr. 28, 2011, 2 pages.
Toivonen, Santtu, "Profile-Based Adaptability in the Semantic Web," ERCIM News, No. 51, Oct. 2002, at <http://www.ercim.org/publication/Ercim_News/enw51/toivonen.html>, printed May 13, 2009, 2 pages.
Vigueras, G. et al., "A comparative study of partitioning methods for crowd simulations," Applied Soft Computing, vol. 10, Issue 1, Jan. 2010, received Dec. 20, 2008, received in revised form Jul. 1, 2009, available online Jul. 22, 2009, pp. 225-235, 12 pages.
Oh, Sejin et al., "CAMAR: Context-aware Mobile Augmented Reality in Smart Space," In Proceedings of International Workshop on Ubiquitous Virtual Reality 2009, Bruce Thomas et al. (Eds.), Jan. 15-18, 2009, University of South Australia, Adelaide, Australia, pp. 48-51, 4 pages.
"CitySense—Powered by Sense Networks," at <http://www.citysense.com/moreinfo.php>, copyright 2008, Sense Networks, printed Sep. 8, 2009, 2 pages.
"ConnectingCadence.com—Mapping the social world.," at <http://www.connectingcadence.com/>, found on the Internet Archive, copyright 2008, ConnectingCadence, printed Apr. 28, 2011, 1 page.
Wu et al., "Crowd Flow Segmentation Using a Novel Region Growing Scheme," In Proceedings PCM 2009, 10th Pacific Rim Conference on Multimedia, Bangkok, Thailand, Dec. 15-18, 2009, pp. 898-907, 10 pages.
Benford, S. et al., "Crowded Collaborative Virtual Environments," Proceedings of the SIGCHI Conference on Human Factors in Computing Systems, Atlanta, Georgia, Mar. 22-27, 1997, 7 pages.
Anciaux, N. et al., "Data Degradation: Making Private Data Less Sensitive Over Time," CIKM 2008, Oct. 26-30, 2008, Napa Valley, California, 2 pages.
Behrend, Andreas, et al., "Data Stream Analysis for Location-Aware Collaborative Information Retrieval," Proceedings of the 12th East European Conference on Advances in Databases and Information Systems, Sep. 5-9, 2008, Pori, Finland, 16 pages.
Ngai, Wang Kay et al., "Efficient Clustering of Uncertain Data," Proceedings of the Sixth International Conference on Data Mining (ICDM'06), Dec. 18-22, 2006, pp. 436-445, copyright 2006, IEEE, 10 pages.
Ertoz, L. et al., "Finding Clusters of Different Sizes, Shapes, and Densities in Noisy, High Dimensional Data," Proceedings of the 2003 SIAM International Conference on Data Mining (SDM 2003), Jan. 24, 2003, pp. 47-58, San Francisco, CA, 12 pages.
"Flickr Shapefiles Public Dataset 1.0," posted by aaron on May 21, 2009, found at <http://code.flickr.com/blog/2009/05/21/flickr-shapefiles-public-dataset-10/>, Yahoo! Inc., printed Jul. 13, 2011, 5 pages.
"Friend of a Friend (FOAF) project," at <http://www.foaf-project.org/>, from the Internet Archive dated May 26, 2008, printed Aug. 10, 2012, 2 pages.

Arrington, M., "I Saw the Future of Social Networking the Other Day," TechCrunch, Apr. 9, 2008, at <http://www.techcrunch.com/2008/04/09/i-saw-the-future-of-social-networking-the-other-day/>, printed May 27, 2009, 28 pages.
Estrin, M., "Is the MySpace crowd lying to marketers?", Oct. 16, 2007, posted at iMedia Connection, at <http://www.imediaconnection.com/contentJ16993.asp>, copyrighted by iMedia Communications, Inc., printed Apr. 28, 2011, 2 pages.
"About Loopt," at <http://about.loopt.com/>, printed May 3, 2011, 4 pages.
"Loopt—About Us," at <https://loopt.com/loopt/aboutUs.aspx>, from the Internet Archive, dated Jun. 29, 2007, copyright 2007, Loopt, Inc., 1 page.
"MobiClique," copyright 2007-2009, Thomson, originally found at <http://www.thlab.net/~apietila/mobiclique/>, printed Oct. 23, 2009, 5 pages.
Abstract, Ratti, C. et al., "Mobile Landscapes: using location data from cell phones for urban analysis," Environment and Planning B: Planning and Design, vol. 33, No. 5, 2006, pp. 727-748, 1 page.
Quinn, M. et al., "Parallel Implementation of the Social Forces Model," Proceedings of the Second International Conference in Pedestrian and Evacuation Dynamics, Greenwich, England, 2003, pp. 63-74, found at <http://web.engr.oregonstate.edu/~metoyer/docs/parallelPeds.pdf>, 12 pages.
"Plazes—Right Plaze, Right Time," at <http://plazes.com>, copyright 2004-2011, Plazes AG, printed May 3, 2011, 2 pages.
Miller, B. N. et al., "PocketLens: Toward a Personal Recommender System," ACM Transactions on Information Systems, vol. 22, No. 3, Jul. 2004, pp. 437-476, 40 pages.
Cox, L.P. et al., "Presence-Exchanges: Toward Sustainable Presence-Sharing," In Proc. Of 7th IEEE Workshop on Mobile Computing Systems and Applications, Apr. 6-7, 2006, Semiahmoo Resort, Washington, pp. 55â€"60, 6 pages.
"Resource Description Framework (RDF)/W3C Semantic Web Activity," at <http://www.w3.org/RDF/>, from the Internet Archive dated Jul. 30, 2008, printed Aug. 10, 2012, 6 pages.
Abstract, "Self-Organized Pedestrian Crowd Dynamics: Experiments, Simulations, and Design Solutions," by Helbing, D. et al., Transportation Science, vol. 39, Issue 1, Feb. 2005, obtained from ACM Digital Library at <http://portal.acm.org/citation.cfm?id=1247227>, printed Apr. 28, 2011, 2 pages.
"Sense Networks," at <http://www.sensenetworks.com/about_us.php>, copyright 2008-2010, Sense Networks, printed Apr. 28, 2011, 1 page.
"Sense Networks—Machine Learning," at <http://www.sensenetworks.com/machinelearning.php>, copyright 2008-2009, Sense Networks, printed Jan. 12, 2009, 2 pages.
"Sense Networks—Technology," at <http://www.sensenetworks.com/technology.php>, copyright 2008-2009, Sense Networks, printed Jan. 12, 2009, 2 pages.
"Sense Networks—The Minimum Volume Embedding Algorithm," at <http://www.sensenetworks.com/mve_algorithm.php>, copyright 2008-2009, Sense Networks, printed Jan. 12, 2009, 2 pages.
Abstract, "Sensor networks for social networks," by Ferry, M.P., Thiesis, Dept. of Electrical Engineering and Computer Science, Massachusetts Institute of Technology, Feb. 2006, obtained from Dspace@MIT, at <http://dspace.mit.edu/handle/1721.1/36764>, printed Apr. 28, 2011, 3 pages.
"Six degrees of separation," at <http://en.wikipedia.org/wiki/Six_degrees_of separation>, last modified on Apr. 19, 2011,printed Apr. 28, 2011, 11 pages.
Cox et al., "SmokeScreen: Flexible Privacy Controls for Presence-Sharing," Proceedings of the 5th International Conference on Mobile Systems, Applications, and Services (2007) (MobiSys '07), Jun. 11-13, 2007, San Juan, Puerto Rico, 13 pages.
"What is LinkedIn?," at <http://www.linkedin.com/static?key=what_is_linkedin&trk=hb_what>, copyright 2011, LinkedIn Corporation, printed Apr. 28, 2011, 1 page.

* cited by examiner

ID="1"/>
PROFILE CONSTRUCTION USING LOCATION-BASED AGGREGATE PROFILE INFORMATION

RELATED APPLICATIONS

This application claims the benefit of provisional patent application Ser. No. 61/173,625, filed Apr. 29, 2009, the disclosure of which is hereby incorporated herein by reference in its entirety.

FIELD OF THE DISCLOSURE

The present disclosure relates to an automated process for creating a user profile of a subject user.

BACKGROUND

Many systems and services rely on user profiles of their users. However, oftentimes, users do not want to take the time to adequately complete their user profiles. As such, there is a need for a system and method for creating user profiles for users that requires minimal user input from the users.

SUMMARY

Systems and methods are disclosed for creating a user profile for a subject user based on historical aggregate profile data for locations at which the subject user was previously located. In one embodiment, one or more location and time period pairs are determined for the subject user. Each location and time period pair defines a previous location of the subject user and a time period during which the subject user was at the previous location. Historical aggregate profile data is obtained for the location and time period pairs. For each location and time period pair, the historical aggregate profile data is generally an aggregation of user profiles of a number of users relevant to location and time period pair. A user profile for the subject user is then created based on the historical aggregate profile data for the one or more location and time period pairs.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 1A:
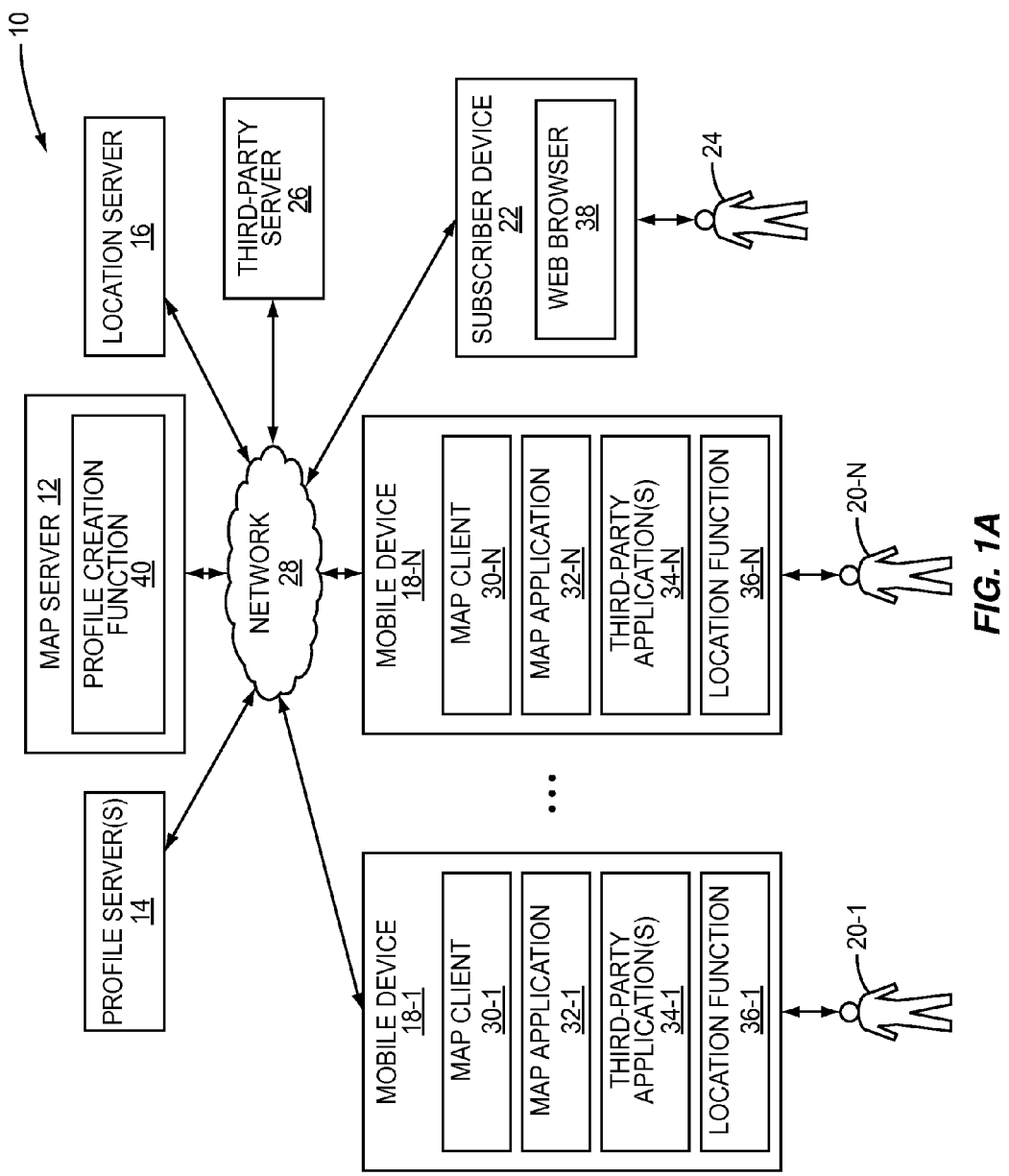
FIG. 1A illustrates a system providing profile creation according to a first exemplary embodiment of the present disclosure.
Figure 1B:
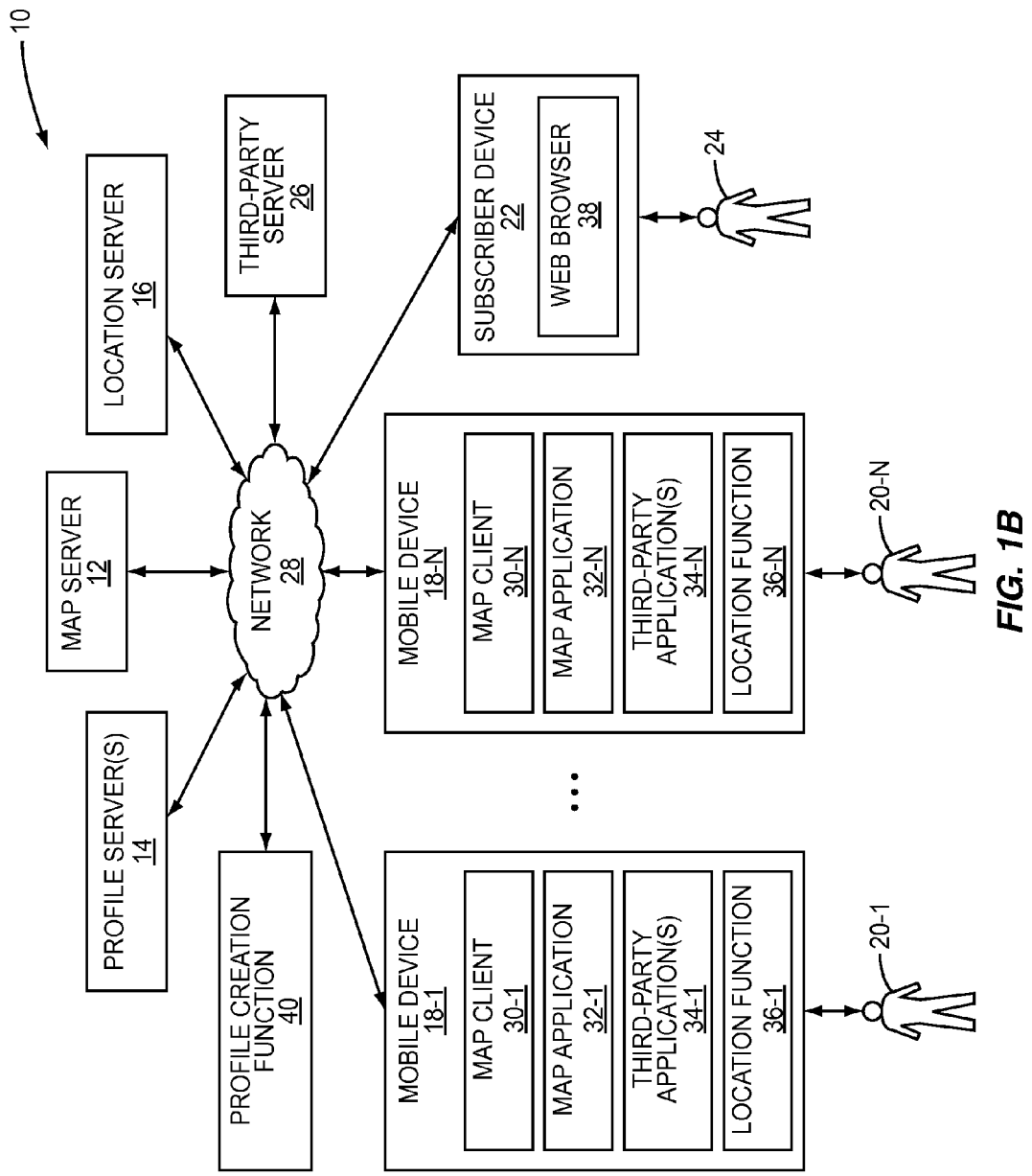
FIG. 1B illustrates a system providing profile creation according to a second exemplary embodiment of the present disclosure.
Figure 4:
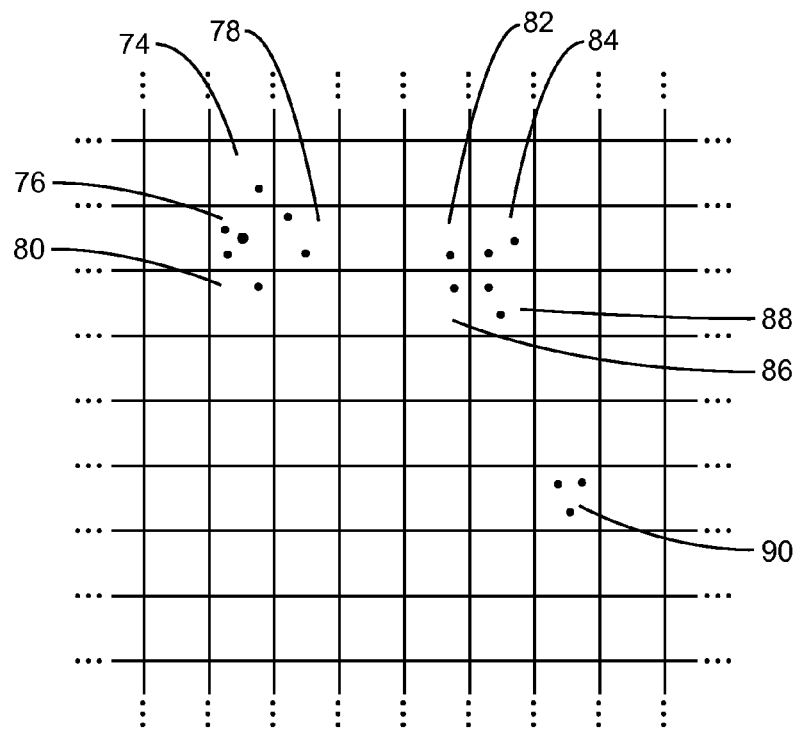
Figure 5:
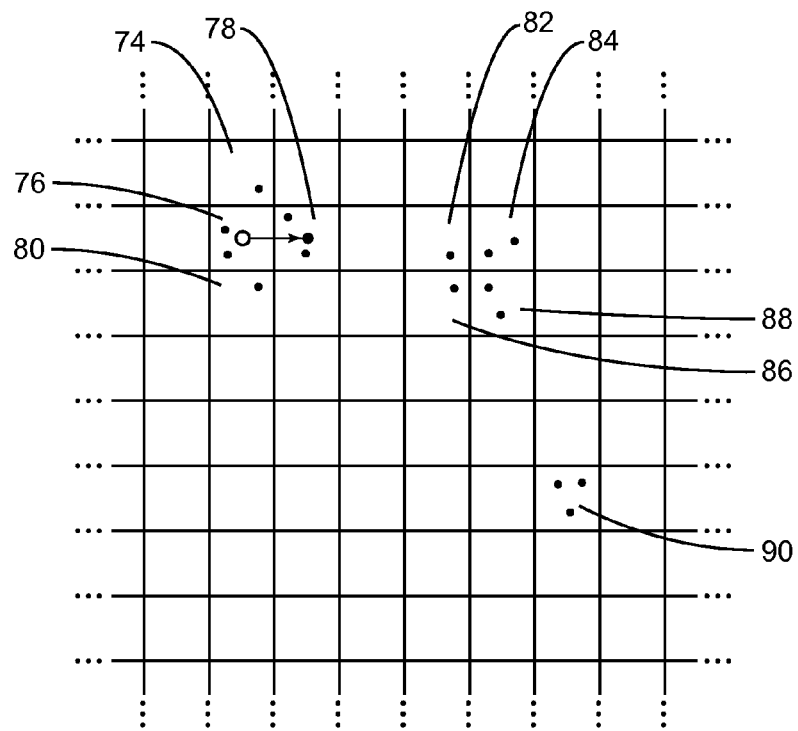
Figure 6:
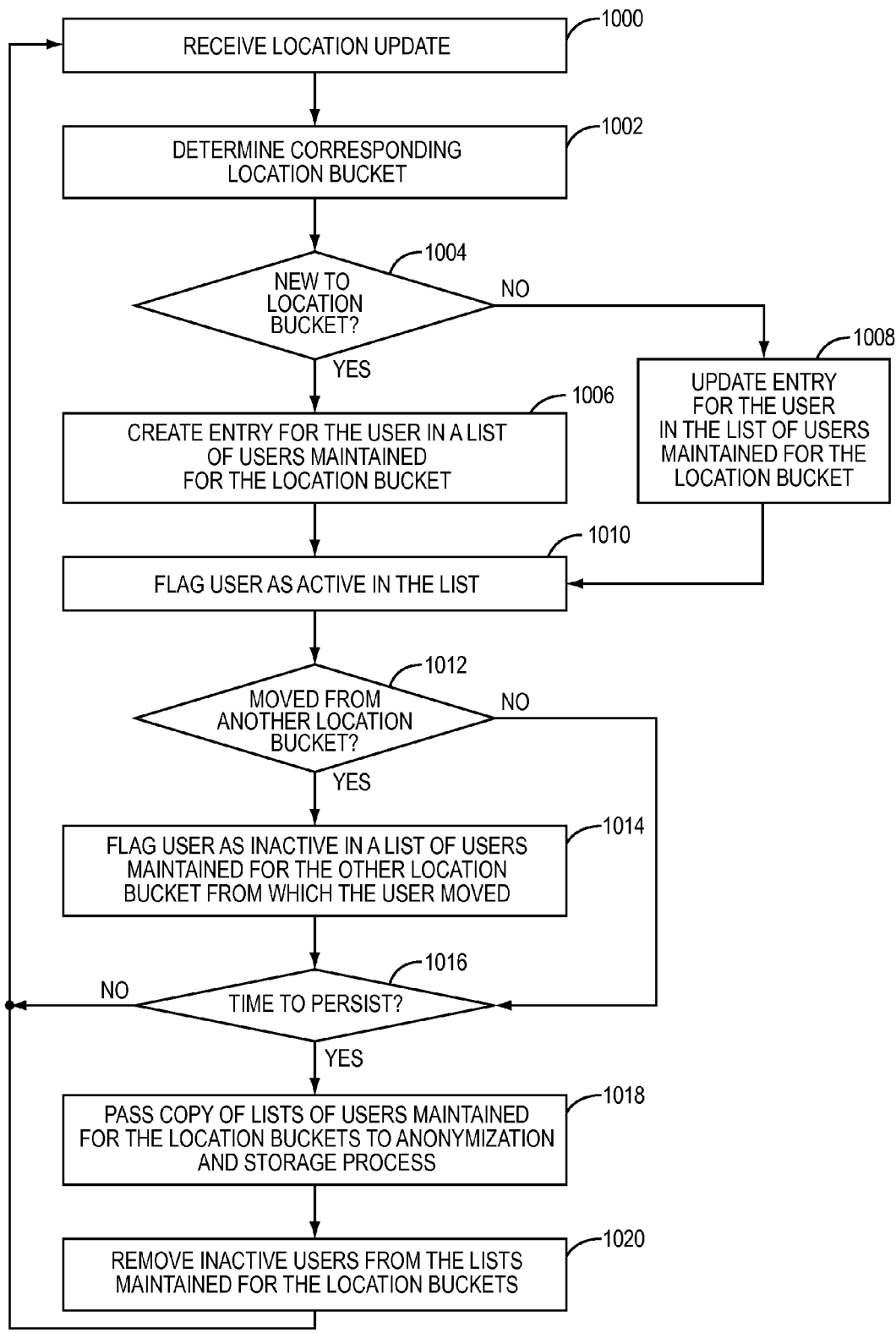
Figure 7:
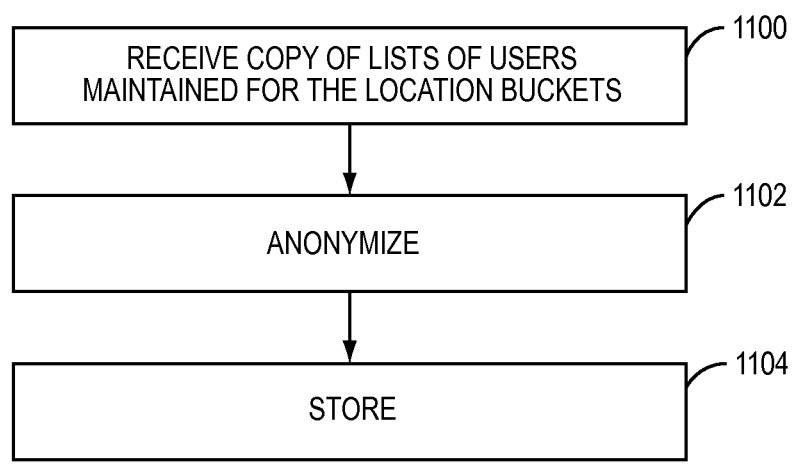
Figure 8:
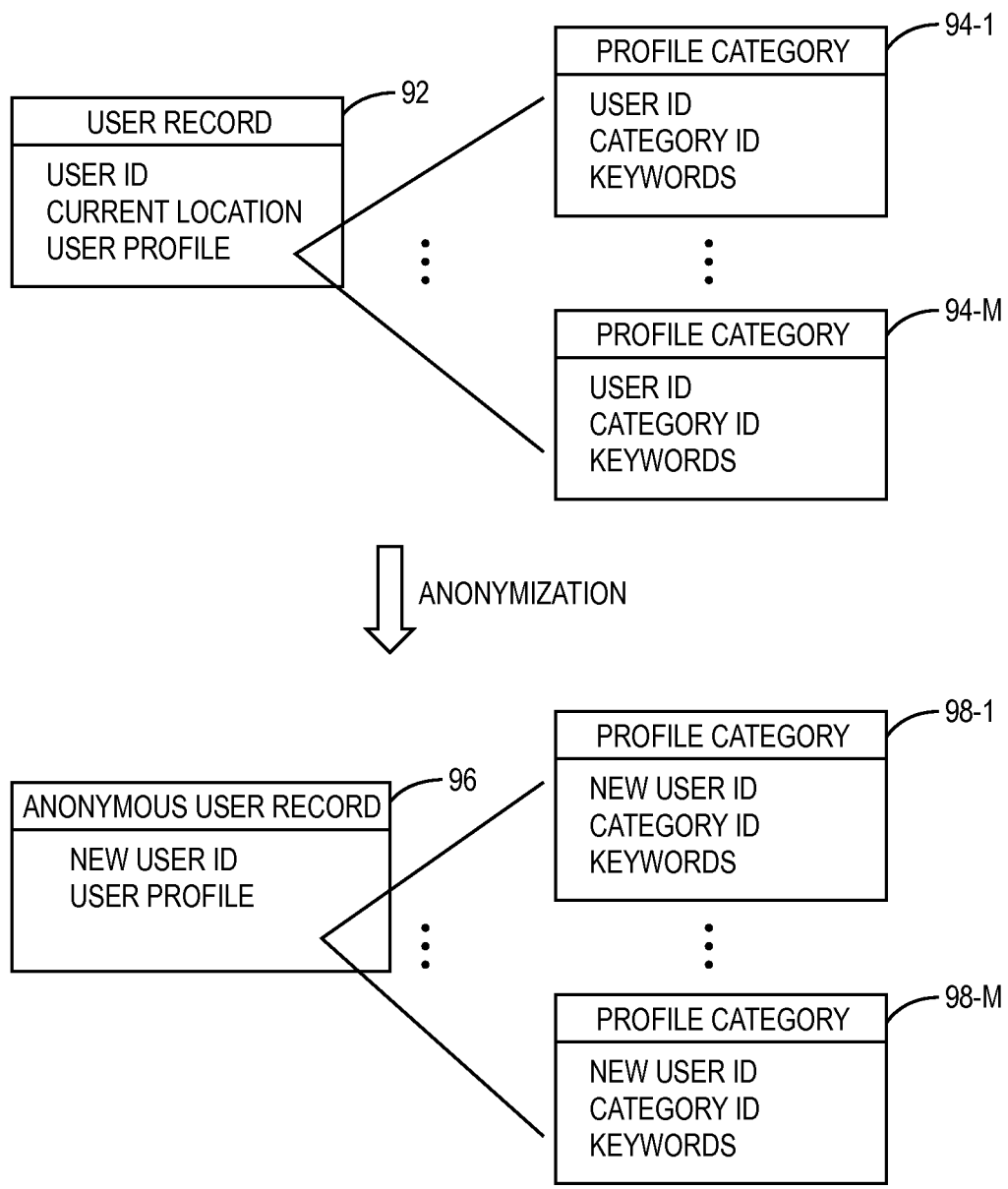
Figure 9:
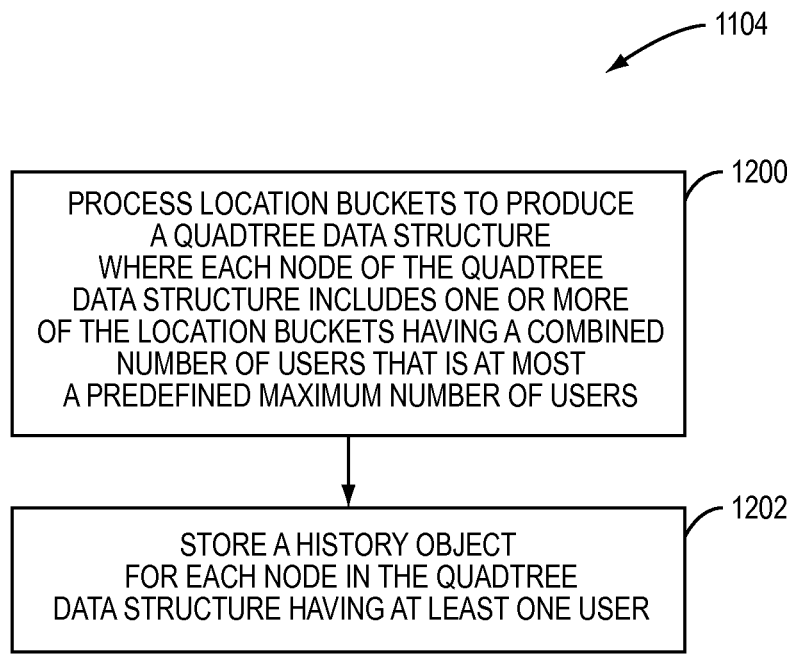
Figure 10:
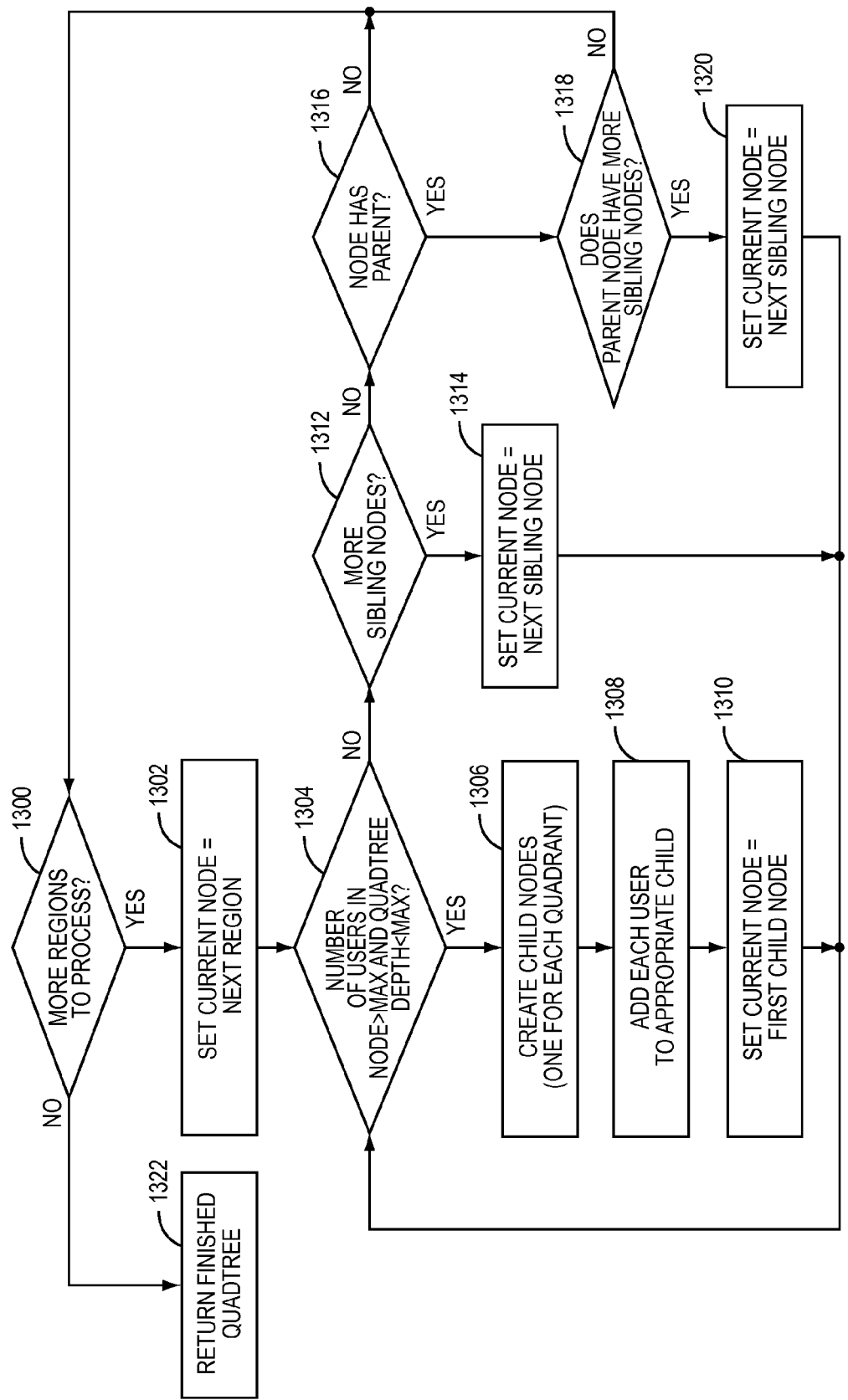
Figure 12:
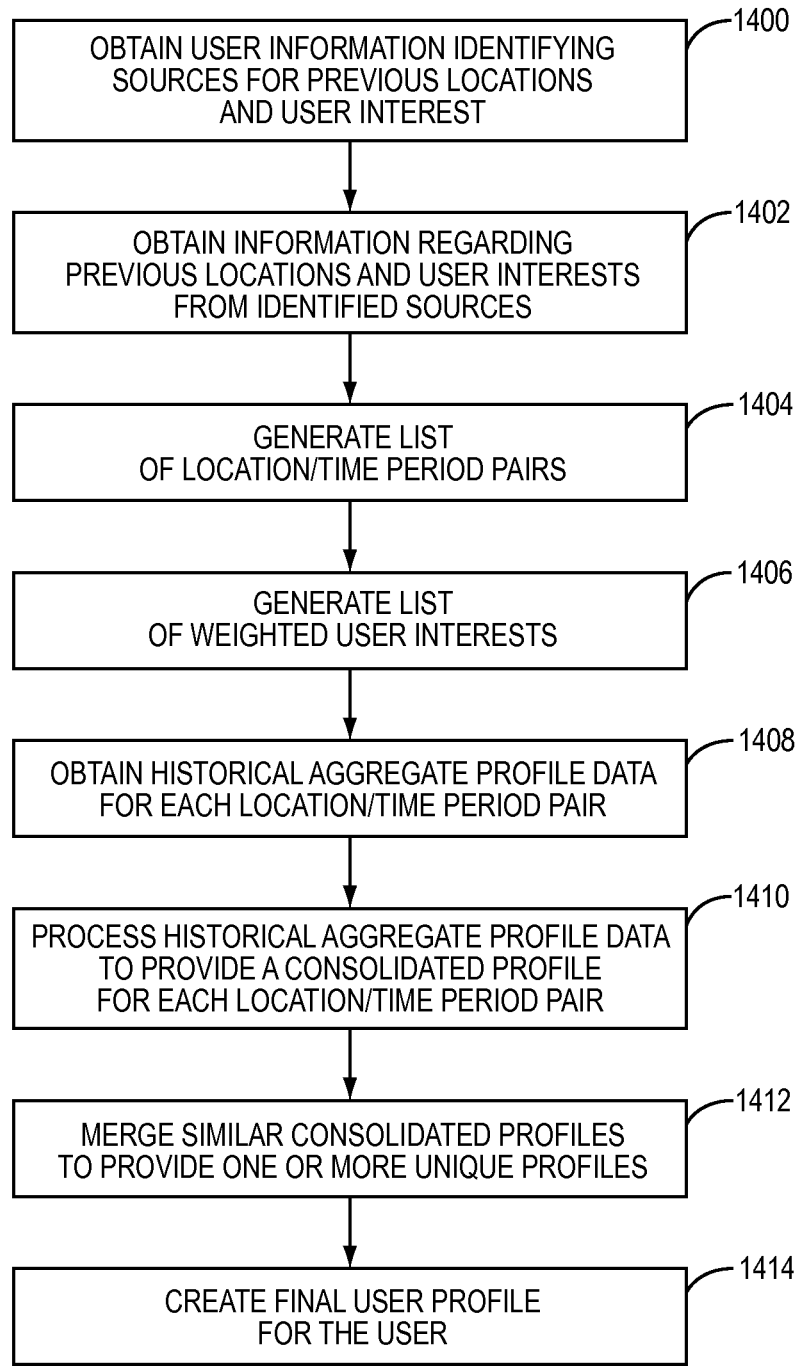
Figure 13:
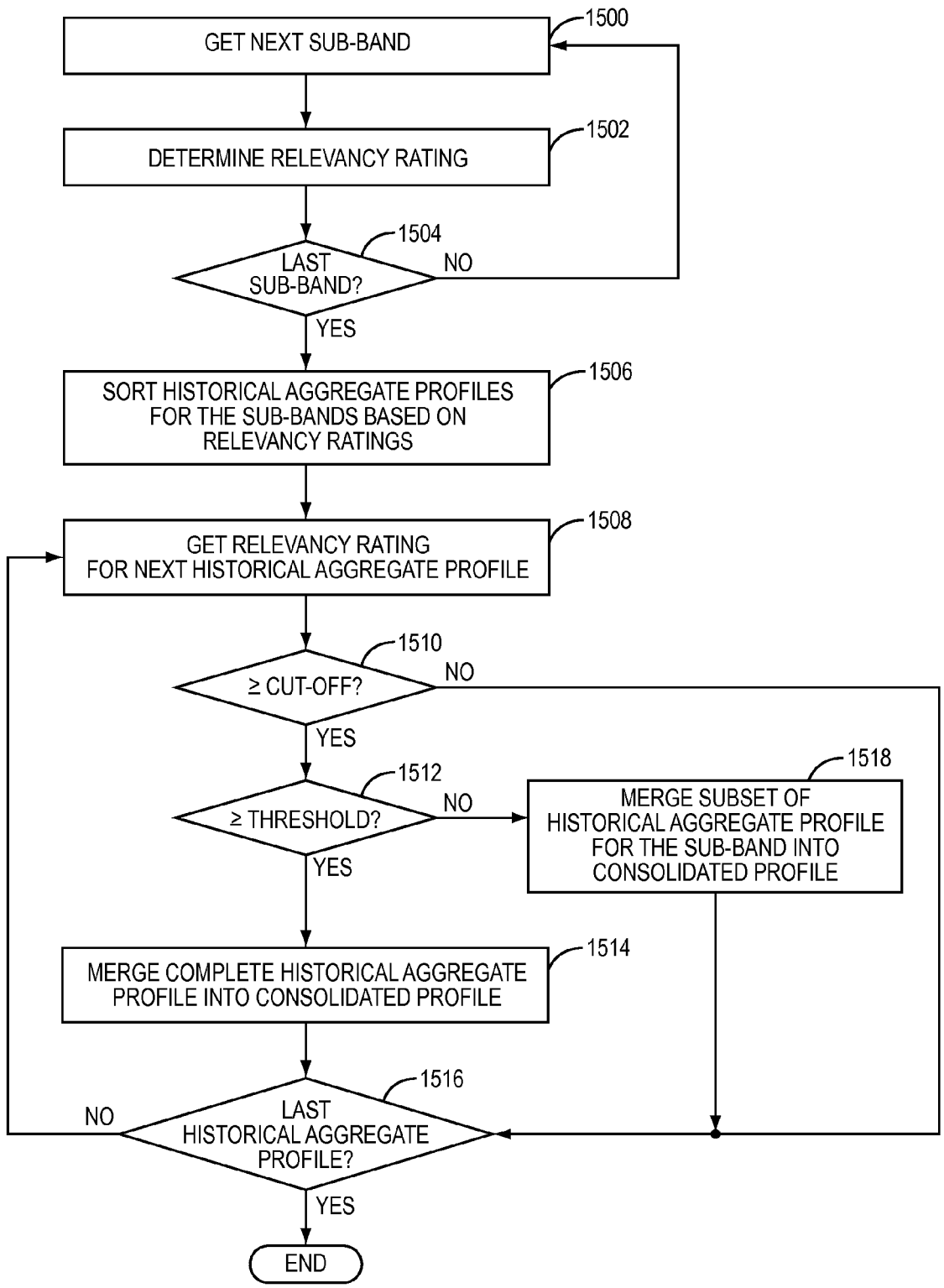
Figure 14:
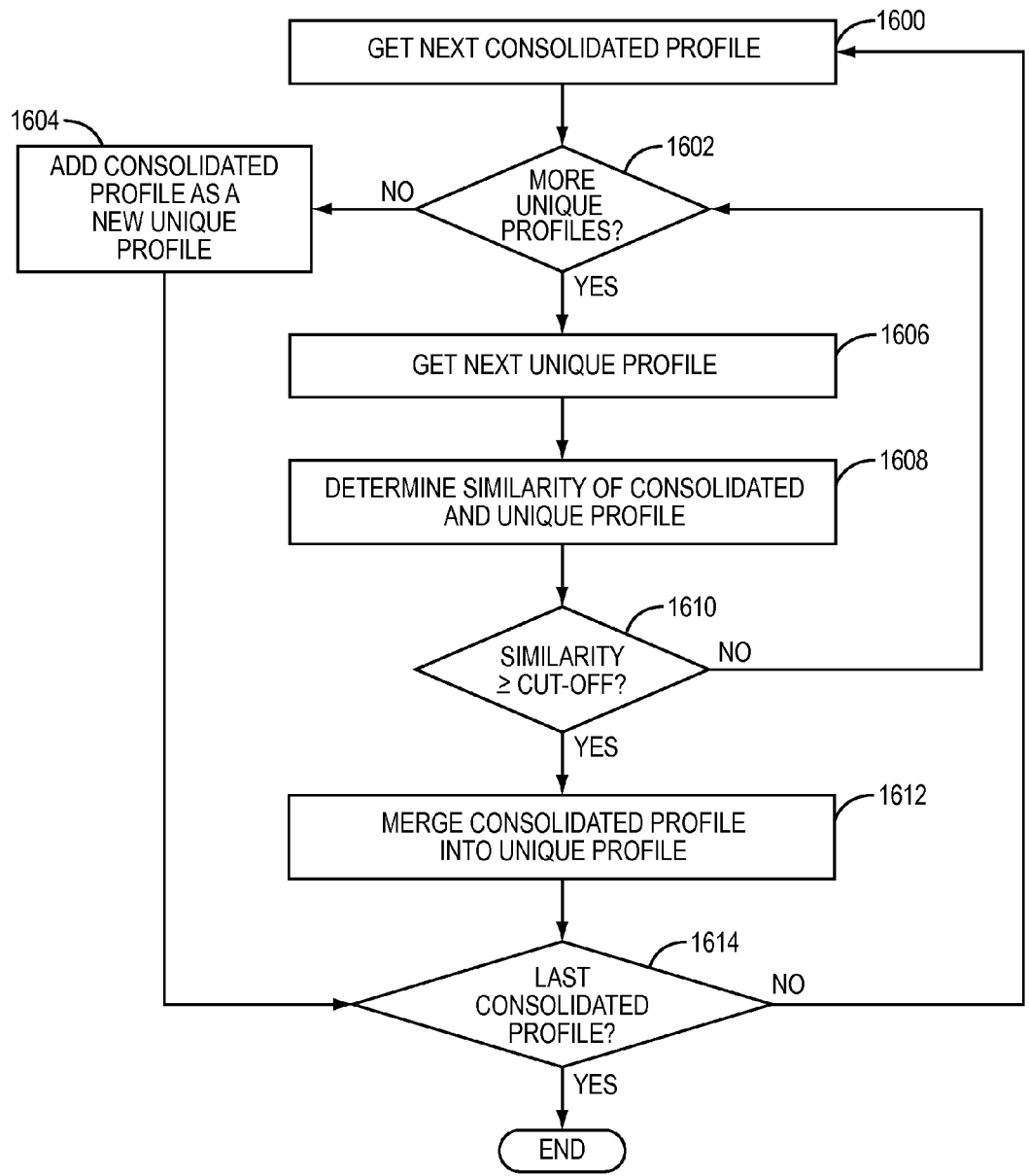
Figure 15A:
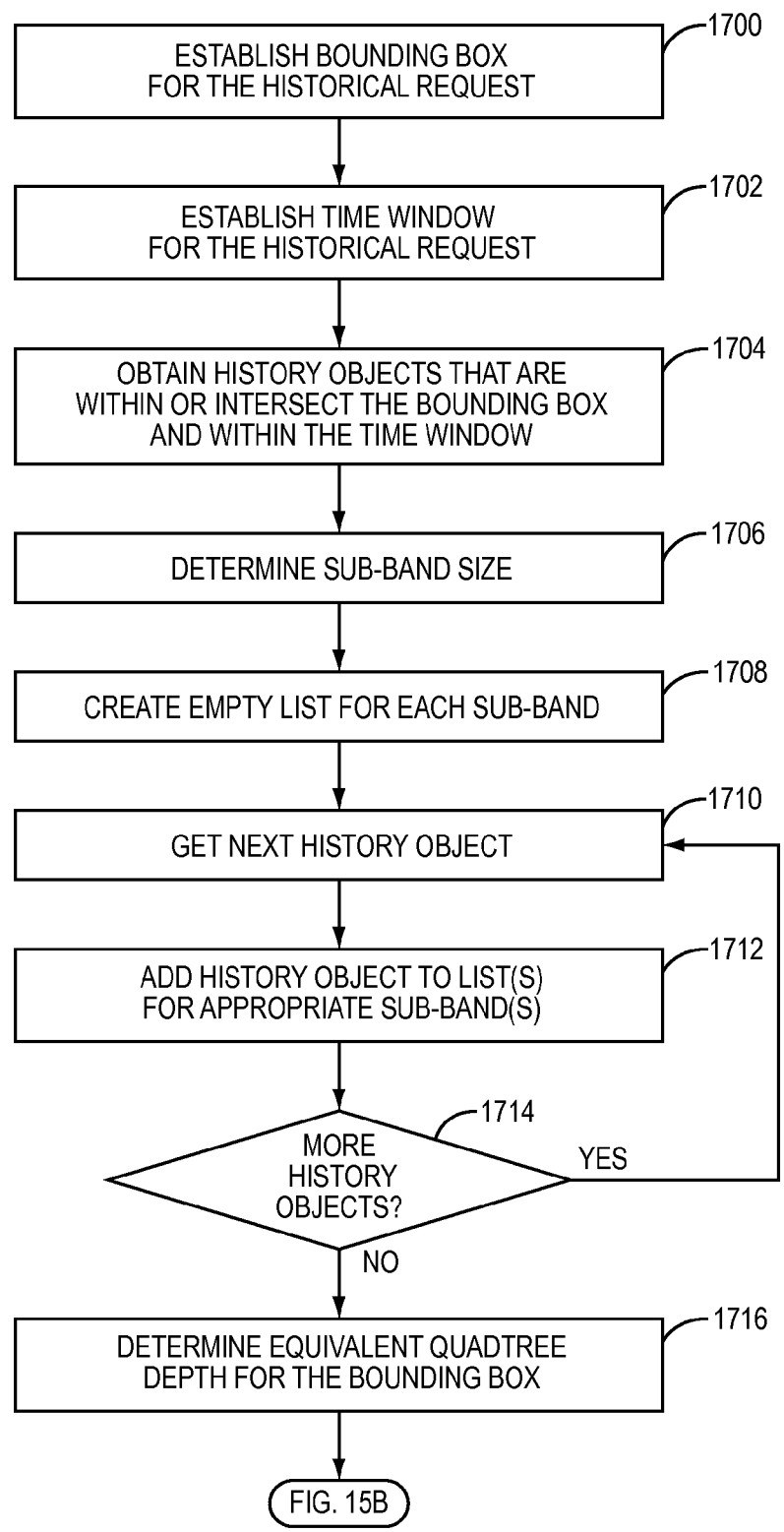
Figure 15B:
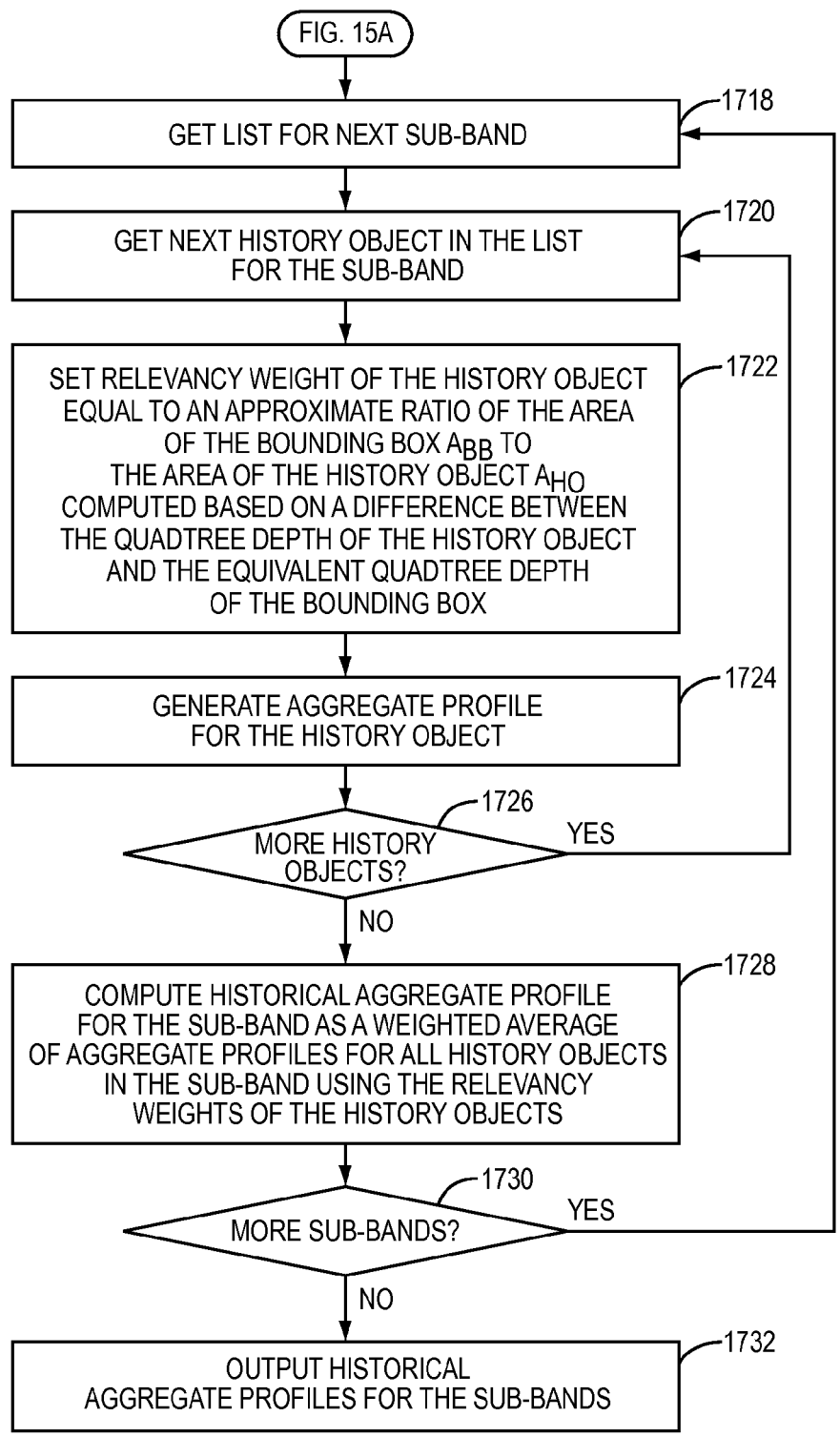
Figure 16:
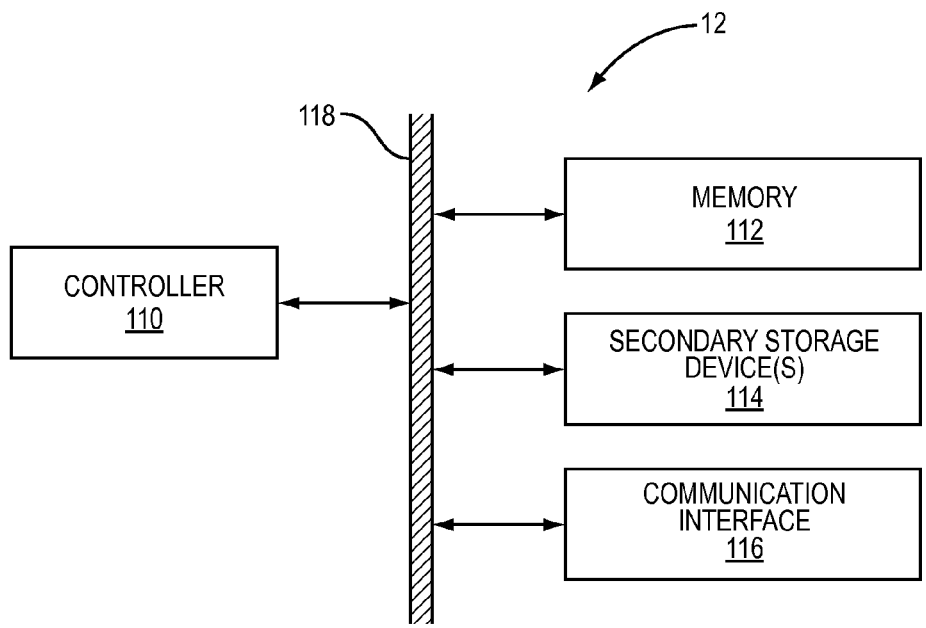
Figure 17:
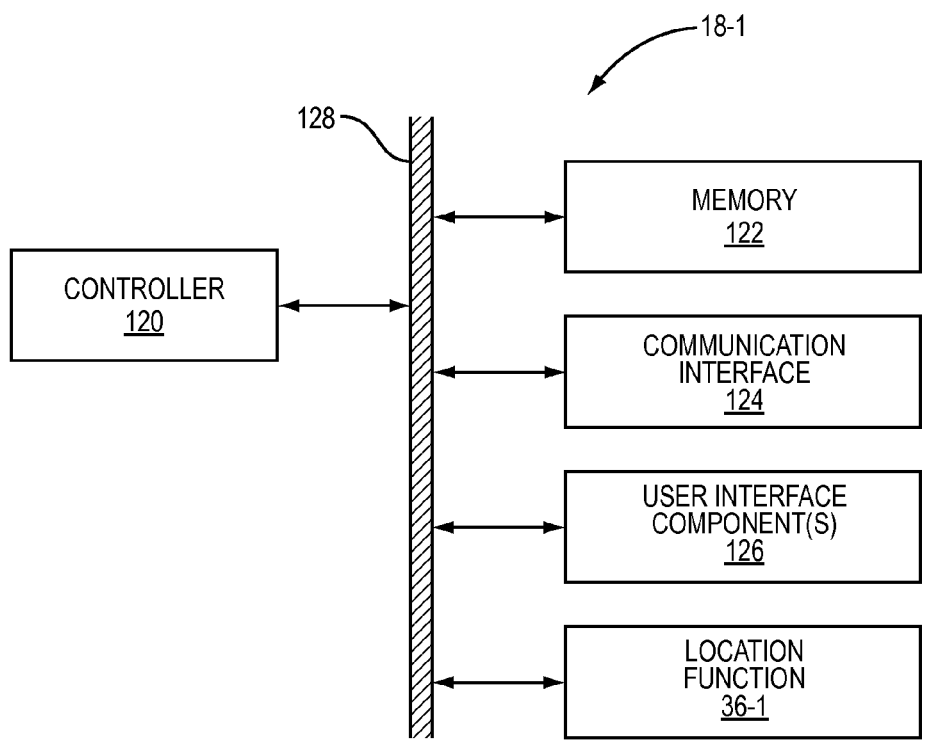
Figure 18:
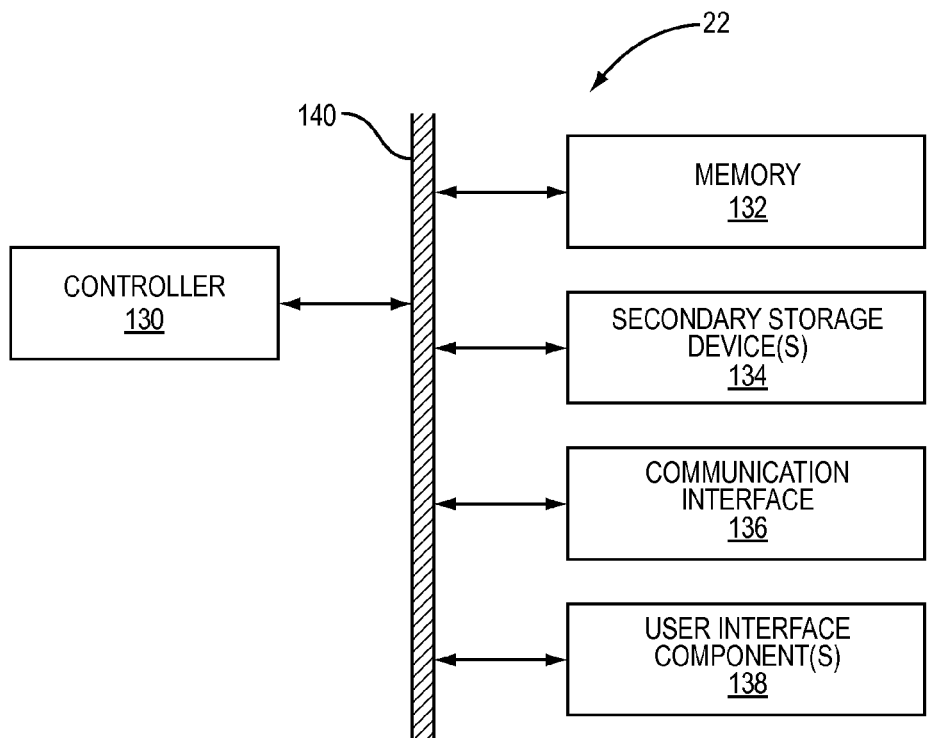
Figure 19:
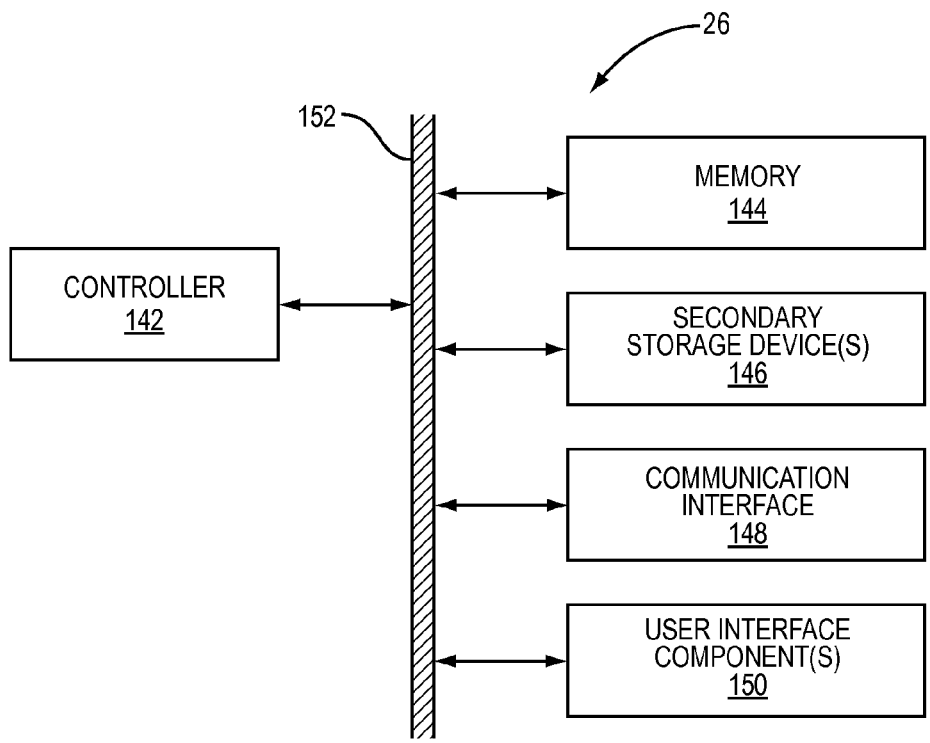
Figure 20:
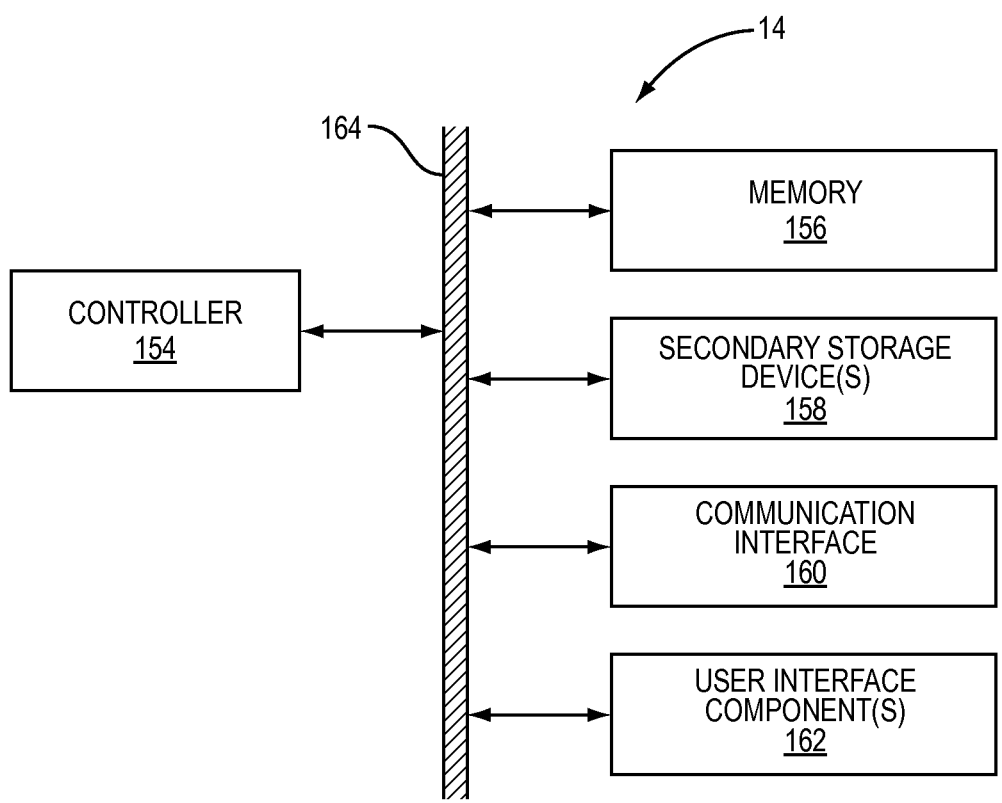

FIGS. 4 and 5 graphically illustrate bucketization of users according to location for purposes of maintaining a historical record of anonymized user profile data by location according to one embodiment of the present disclosure;

FIG. 6 is a flow chart illustrating the operation of a foreground bucketization process performed by the MAP server to maintain the lists of users for location buckets for purposes of maintaining a historical record of anonymized user profile data by location according to one embodiment of the present disclosure;

FIG. 7 is a flow chart illustrating the anonymization and storage process performed by the MAP server for the location buckets in order to maintain a historical record of anonymized user profile data by location according to one embodiment of the present disclosure;

FIG. 8 graphically illustrates anonymization of a user record according to one embodiment of the present disclosure;

FIG. 9 is a flow chart for a quadtree based storage process that may be used to store anonymized user profile data for location buckets according to one embodiment of the present disclosure;

FIG. 10 is a flow chart illustrating a quadtree algorithm that may be used to process the location buckets for storage of the anonymized user profile data according to one embodiment of the present disclosure;

FIGS. 11A through 11E graphically illustrate the process of FIG. 10 for the generation of a quadtree data structure for one exemplary base quadtree region;

FIG. 12 is a flow chart illustrating the operation of the profile creation function of FIGS. 1A and 1B to create a user profile for a subject user based on historical aggregate profile data according to one embodiment of the present disclosure;

FIG. 13 is a more detailed illustration of the step of processing the historical aggregate profile data for the location and time period pairs determined for the subject user to provide corresponding consolidated profiles for the location and time period pairs from FIG. 12 according to one embodiment of the present disclosure;

FIG. 14 is a more detailed illustration of the step of merging similar consolidated profiles to provide a number of unique profiles from FIG. 12 according to one embodiment of the present disclosure;

FIGS. 15A and 15B provide a flow chart illustrating the operation of the MAP server of FIGS. 1A and 1B to generate historical aggregate profile data for a location and time period pair identified for a subject user according to one embodiment of the present disclosure;

FIG. 16 is a block diagram of the MAP server of FIGS. 1A and 1B according to one embodiment of the present disclosure;

FIG. 17 is a block diagram of one of the mobile devices of FIGS. 1A and 1B according to one embodiment of the present disclosure;

FIG. 18 is a block diagram of the subscriber device of FIGS. 1A and 1B according to one embodiment of the present disclosure;

FIG. 19 is a block diagram of the third-party server of FIGS. 1A and 1B according to one embodiment of the present disclosure; and FIG. 20 is a block diagram of the profile server of FIGS. 1A and 1B according to one embodiment of the present disclosure.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1A illustrates a system 10 for creating a user profile of a subject user according to a first exemplary embodiment of the present disclosure. In this embodiment, the system 10 includes a Mobile Aggregate Profile (MAP) server 12, one or more profile servers 14, a location server 16, a number of mobile devices 18-1 through 18-N having associated users 20-1 through 20-N, a subscriber device 22 having an associated subscriber 24, and a third-party server 26 communicatively coupled via a network 28. The network 28 may be any type of network or any combination of networks. Specifically, the network 28 may include wired components, wireless components, or both wired and wireless components. In one exemplary embodiment, the network 28 is a distributed public network such as the Internet, where the mobile devices 18-1 through 18-N are enabled to connect to the network 28 via local wireless connections (e.g., WiFi or IEEE 802.11 connections) or wireless telecommunications connections (e.g., 3G or 4G telecommunications connections such as GSM, LTE, W-CDMA, or WiMAX connections).

As discussed below in detail, the MAP server 12 operates to obtain current locations, including location updates, and user profiles of the users 20-1 through 20-N of the mobile devices 18-1 through 18-N. The current locations of the users 20-1 through 20-N can be expressed as positional geographic coordinates such as latitude-longitude pairs, and a height vector (if applicable), or any other similar information capable of identifying a given physical point in space in a two-dimensional or three-dimensional coordinate system. Using the current locations and user profiles of the users 20-1 through 20-N, the MAP server 12 is enabled to provide a number of features such as, but not limited to, maintaining a historical record of anonymized user profile data by location, generating aggregate profile data over time for a Point of Interest (POI) or Area of Interest (AOI) using the historical record of anonymized user profile data, identifying crowds of users using current locations and/or user profiles of the users 20-1 through 20-N, and generating aggregate profiles for crowds of users at a POI or in an AOI using the current user profiles of users in the crowds. While not essential, for additional information regarding the MAP server 12, the interested reader is directed to U.S. patent application Ser. No. 12/645,535 entitled MAINTAINING A HISTORICAL RECORD OF ANONYMIZED USER PROFILE DATA BY LOCATION FOR USERS IN A MOBILE ENVIRONMENT, U.S. patent application Ser. No. 12/645,532 entitled FORMING CROWDS AND PROVIDING ACCESS TO CROWD DATA IN A MOBILE ENVIRONMENT, U.S. patent application Ser. No. 12/645,539 entitled ANONYMOUS CROWD TRACKING, U.S. patent application Ser. No. 12/645,544 entitled MODIFYING A USER'S CONTRIBUTION TO AN AGGREGATE PROFILE BASED ON TIME BETWEEN LOCATION UPDATES AND EXTERNAL EVENTS, U.S. patent application Ser. No. 12/645,546 entitled CROWD FORMATION FOR MOBILE DEVICE USERS, U.S. patent application Ser. No. 12/645,556 entitled SERVING A REQUEST FOR DATA FROM A HISTORICAL RECORD OF ANONYMIZED USER PROFILE DATA IN A MOBILE ENVIRONMENT, and U.S. patent application Ser. No. 12/645,560 entitled HANDLING CROWD REQUESTS FOR LARGE GEOGRAPHIC AREAS, all of which were filed on Dec. 23, 2009 and are hereby incorporated herein by reference in their entireties. Note that while the MAP server 12 is illustrated as a single server for simplicity and ease of discussion, it should be appreciated that the MAP server 12 may be implemented as a single physical server or multiple physical servers operating in a collaborative manner for purposes of redundancy and/or load sharing.

In general, the one or more profile servers 14 operate to store user profiles for a number of persons including the users 20-1 through 20-N of the mobile devices 18-1 through 18-N. For example, the one or more profile servers 14 may be servers providing social network services such as the Facebook® social networking service, the MySpace® social networking service, the LinkedIN® social networking service, and/or the like. The MAP server 12 may directly or indirectly obtain user profiles of some if not all of the users 20-1 through 20-N from the one or more profile servers 14. The location server 16 generally operates to receive location updates from the mobile devices 18-1 through 18-N and make the location updates available to entities such as, for instance, the MAP server 12. In one exemplary embodiment, the location server 16 is a server operating to provide Yahoo!'s FireEagle service. Before proceeding, it should be noted that while the system 10 of FIG. 1A illustrates an embodiment where the one or more profile servers 14 and the location server 16 are separate from the MAP server 12, the present disclosure is not limited thereto. In an alternative embodiment, the functionality of the one or more profile servers 14 and/or the location server 16 may be implemented within the MAP server 12.

The mobile devices 18-1 through 18-N may be mobile smart phones, portable media player devices, mobile gaming devices, or the like. Some exemplary mobile devices that may be programmed or otherwise configured to operate as the mobile devices 18-1 through 18-N are the Apple® iPhone®, the Palm Pre™, the Samsung Rogue™, the Blackberry® Storm™, and the Apple® iPod Touch® device. However, this list of exemplary mobile devices is not exhaustive and is not intended to limit the scope of the present disclosure.

The mobile devices 18-1 through 18-N include MAP clients 30-1 through 30-N, MAP applications 32-1 through 32-N, third-party applications 34-1 through 34-N, and location functions 36-1 through 36-N, respectively. Using the mobile device 18-1 as an example, the MAP client 30-1 is preferably implemented in software. In general, in the preferred embodiment, the MAP client 30-1 is a middleware layer operating to interface an application layer (i.e., the MAP application 32-1 and the third-party applications 34-1) to the MAP server 12. More specifically, the MAP client 30-1 enables the MAP application 32-1 and the third-party applications 34-1 to request and receive data from the MAP server 12. In addition, the MAP client 30-1 enables applications, such as the MAP application 32-1 and the third-party applications 34-1, to access data from the MAP server 12. Note that the MAP clients 30-1 through 30-N may alternatively be implemented with the MAP applications 32-1 through 32-N and/or the third-party applications 34-1 through 34-N.

The MAP application 32-1 is also preferably implemented in software. The MAP application 32-1 generally provides a user interface component between the user 20-1 and the MAP server 12. More specifically, among other things, the MAP application 32-1 may enable the user 20-1 to initiate historical requests for historical data (e.g., historical aggregate profile data) or crowd requests for crowd data (e.g., aggregate profile data and/or crowd characteristics data) from the MAP server 12 for a POI or AOI. The MAP application 32-1 also enables the user 20-1 to configure various settings.

The third-party applications 34-1 are preferably implemented in software. The third-party applications 34-1 operate to access the MAP server 12 via the MAP client 30-1. The third-party applications 34-1 may utilize data obtained from the MAP server 12 in any desired manner. As an example, one of the third party applications 34-1 may be a gaming application that utilizes historical aggregate profile data to notify the user 20-1 of POIs or AOIs where persons having an interest in the game have historically congregated.

The location function 36-1 may be implemented in hardware, software, or a combination thereof. In general, the location function 36-1 operates to determine or otherwise obtain the location of the mobile device 18-1. For example, the location function 36-1 may be or include a Global Positioning System (GPS) receiver.

The subscriber device 22 is a physical device such as a personal computer, a mobile computer (e.g., a notebook computer, a netbook computer, a tablet computer, etc.), a mobile smart phone, or the like. The subscriber 24 associated with the subscriber device 22 is a person or entity. In general, the subscriber device 22 enables the subscriber 24 to access the MAP server 12 via a web browser 38 to obtain various types of data, preferably for a fee. For example, the subscriber 24 may pay a fee to have access to historical aggregate profile data for one or more POIs and/or one or more AOIs, pay a fee to have access to crowd data such as aggregate profiles for crowds located at one or more POIs and/or located in one or more AOIs, pay a fee to track crowds, or the like. Note that the web browser 38 is exemplary. In another embodiment, the subscriber device 22 is enabled to access the MAP server 12 via a custom application.

The third-party server 26 is a physical server that has access to data from the MAP server 12 such as historical aggregate profile data for one or more POIs or one or more AOIs or crowd data such as aggregate profiles for one or more crowds at one or more POIs or within one or more AOIs. Based on the data from the MAP server 12, the third-party server 26 operates to provide a service such as, for example, targeted advertising. For example, the third-party server 26 may obtain anonymous aggregate profile data for one or more crowds located at a POI and then provide targeted advertising to known users located at the POI based on the anonymous aggregate profile data. Note that while targeted advertising is mentioned as an exemplary service provided by the third-party server 26, other types of services may additionally or alternatively be provided. Other types of services that may be provided by the third-party server 26 will be apparent to one of ordinary skill in the art upon reading this disclosure.

Lastly, in this embodiment, the MAP server 12 includes a profile creation function 40. The profile creation function 40 is preferably implemented in software, but is not limited thereto. As discussed below in detail, the profile creation function 40 operates to create user profiles for subject users based on historical aggregate profile data for locations at which the subject users were previously located. The subject users may include, but are not limited to, the users 20-1 through 20-N, the subscriber 24, users of social networking services hosted by the one or more profile servers 14, and/or users associated with the third-party server 26. Using the user 20-1 as an example, the profile creation function 40 operates to create the user profile of the user 20-1 based on historical aggregate profile data for a number of previous locations at which the user 20-1 was previously located during corresponding time periods during which the user 20-1 was at those previous locations.

FIG. 1B illustrates the system 10 for creating a user profile of a subject user according to a second exemplary embodiment of the present disclosure. In this embodiment, the system 10 includes the MAP server 12, the one or more profile servers 14, the location server 16, the mobile devices 18-1 through 18-N having the associated users 20-1 through 20-N, the subscriber device 22 having the associated subscriber 24, and the third-party server 26 communicatively coupled via the network 28. However, in this embodiment, the profile creation function 40 is implemented apart from the MAP server 12. Specifically, the profile creation function 40 may be implemented on any network device that is enabled to communicate with the MAP server 12 via the network 28. For example, the profile creation function 40 may be implemented on the profile server 14, one or more of the mobile devices 18-1 through 18-N, the subscriber device 22, and/or the third-party server 26.

Figure 2:
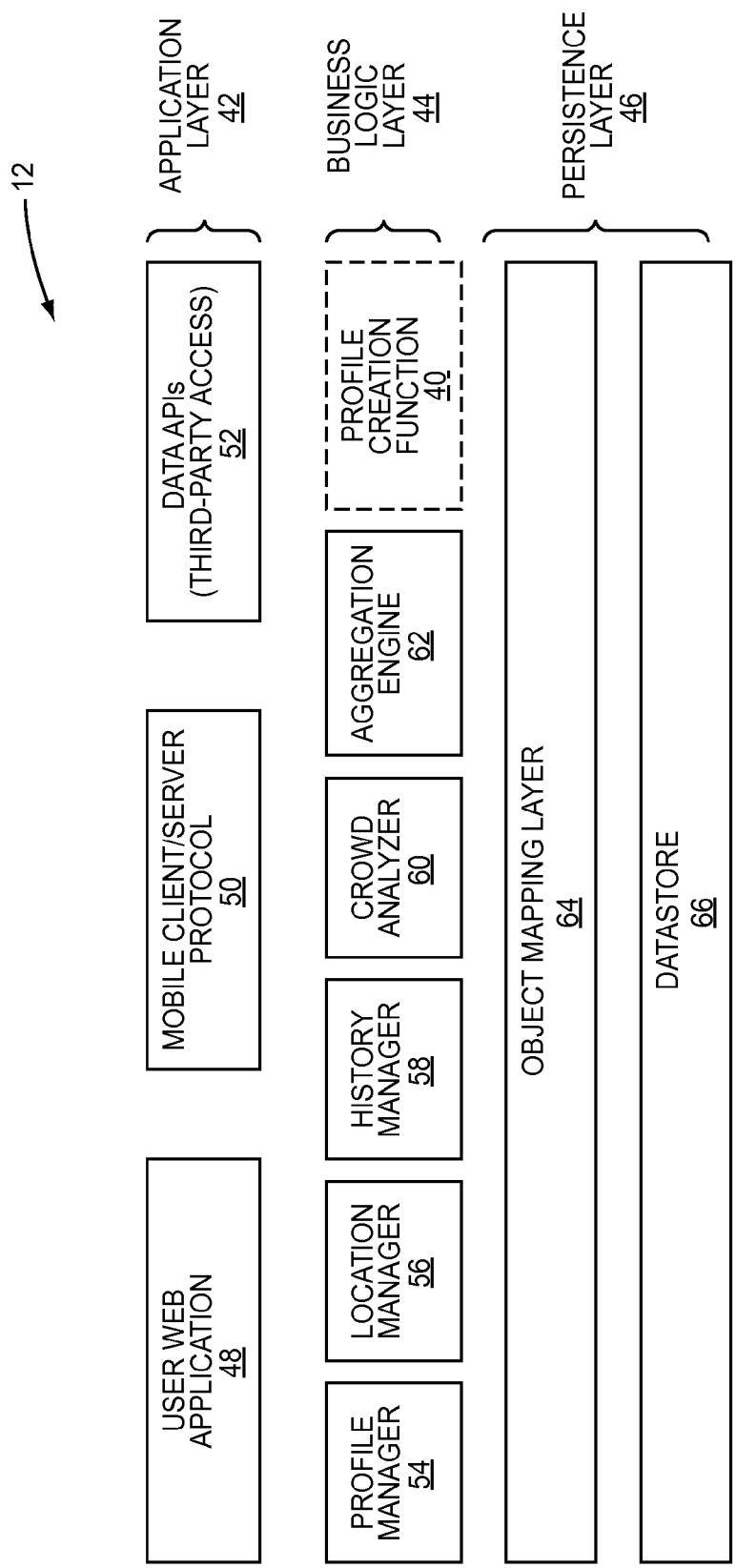
FIG. 2 is a block diagram of the Mobile Aggregate Profile (MAP) server of FIGS. 1A and 1B according to one embodiment of the present disclosure.

Before describing the operation of the profile creation function 40 in detail, FIGS. 2 through 11E provide a description of some of the features of the MAP server 12 that may be utilized directly or indirectly by the profile creation function 40. FIG. 2 is a block diagram of the MAP server 12 of FIGS. 1A and 1B according to one embodiment of the present disclosure. As illustrated, the MAP server 12 includes an application layer 42, a business logic layer 44, and a persistence layer 46. The application layer 42 includes a user web application 48, a mobile client/server protocol component 50, and one or more data Application Programming Interfaces (APIs) 52. The user web application 48 is preferably implemented in software and operates to provide a web interface for users, such as the subscriber 24, to access the MAP server 12 via a web browser. The mobile client/server protocol component 50 is preferably implemented in software and operates to provide an interface between the MAP server 12 and the MAP clients 30-1 through 30-N hosted by the mobile devices 18-1 through 18-N. The data APIs 52 enable third-party services, such as that hosted by the third-party server 26, to access the MAP server 12.

The business logic layer 44 includes a profile manager 54, a location manager 56, a history manager 58, a crowd analyzer 60, and an aggregation engine 62, each of which is preferably implemented in software. In addition, in the embodiment of FIG. 1A, the business logic layer 44 also includes the profile creation function 40. Note, however, that in the embodiment of FIG. 1B, the business logic layer 44 does not include the profile creation function 40. In general, the profile manager 54 manages the creation and storage of user profiles of the users 20-1 through 20-N. In the embodiment of FIG. 1A, the profile manager 54 utilizes the profile creation function 40 to create and store user profiles for at least some, if not all, of the users 20-1 through 20-N. In addition, for any of the users 20-1 through 20-N whose user profiles are not created by the profile creation function 40, the profile manager 54 obtains user profiles for those users directly or indirectly from the one or more profile servers 14 and stores corresponding user profiles at the MAP server 12. In the embodiment of FIG. 1B, the profile manager 54 obtains user profiles of the users 20-1 through 20-N indirectly or directly from the one or more profile servers 14 and stores corresponding user profiles for the users 20-1 through 20-N at the MAP server 12.

The location manager 56 operates to obtain the current locations of the users 20-1 through 20-N including location updates. As discussed below, the current locations of the users 20-1 through 20-N may be obtained directly from the mobile devices 18-1 through 18-N and/or obtained from the location server 16. The location manager 56 stores the current locations of the users 20-1 through 20-N along with the user profiles of the users 20-1 through 20-N in corresponding user records in the persistence layer 46.

The history manager 58 generally operates to maintain a historical record of anonymized user profile data by location. The crowd analyzer 60 operates to form crowds of users. In one embodiment, the crowd analyzer 60 utilizes a spatial crowd formation algorithm. However, the present disclosure is not limited thereto. In addition, the crowd analyzer 60 may further characterize crowds to reflect degree of fragmentation, best-case and worst-case degree of separation (DOS), and/or degree of bi-directionality of relationships. Still further, the crowd analyzer 60 may also operate to track crowds. The aggregation engine 62 generally operates to provide aggregate profile data as needed. The aggregate profile data may be historical aggregate profile data for one or more geographic locations (e.g., one or more POIs) or one or more geographic areas (e.g., one or more AOIs) or aggregate profile data for crowd(s) currently at one or more geographic locations or in one or more geographic areas.

The persistence layer 46 includes an object mapping layer 64 and a datastore 66. The object mapping layer 64 is preferably implemented in software. The datastore 66 is preferably a relational database, which is implemented in a combination of hardware (i.e., physical data storage hardware) and software (i.e., relational database software). In this embodiment, the business logic layer 44 is implemented in an object-oriented programming language such as, for example, Java. As such, the object mapping layer 64 operates to map objects used in the business logic layer 44 to relational database entities stored in the datastore 66. Note that, in one embodiment, data is stored in the datastore 66 in a Resource Description Framework (RDF) compatible format.

In an alternative embodiment, rather than being a relational database, the datastore 66 may be implemented as an RDF datastore. More specifically, the RDF datastore may be compatible with RDF technology adopted by Semantic Web activities. Namely, the RDF datastore may use the Friend-Of-A-Friend (FOAF) vocabulary for describing people, their social networks, and their interests. In this embodiment, the MAP server 12 may be designed to accept raw FOAF files describing persons, their friends, and their interests. These FOAF files are currently output by some social networking services such as LiveJournal™ and Facebook®. The MAP server 12 may then persist RDF descriptions of the users 20-1 through 20-N as a proprietary extension of the FOAF vocabulary that includes additional properties desired for the system 10.

Figure 3:
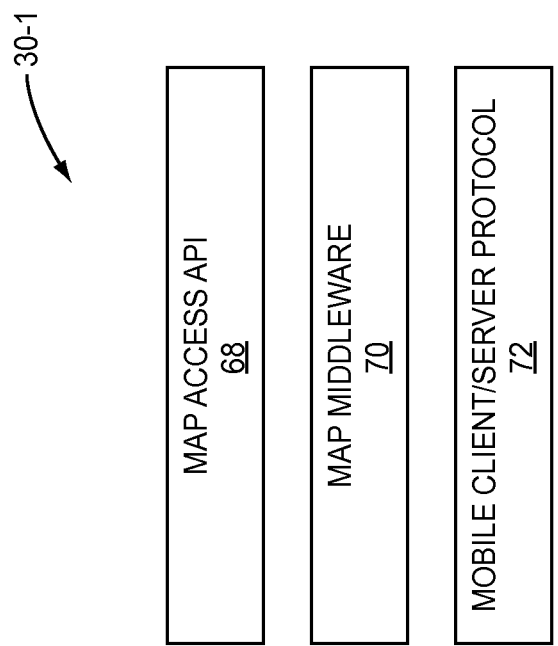
FIG. 3 is a block diagram of the MAP client of one of the mobile devices of FIGS. 1A and 1B according to one embodiment of the present disclosure.

FIG. 3 illustrates the MAP client 30-1 of FIGS. 1A and 1B in more detail according to one embodiment of the present disclosure. This discussion is equally applicable to the other MAP clients 30-2 through 30-N. As illustrated, in this embodiment, the MAP client 30-1 includes a MAP access API 68, a MAP middleware component 70, and a mobile client/server protocol component 72. The MAP access API 68 is implemented in software and provides an interface by which the MAP client 30-1 and the third-party applications 34-1 are enabled to access the MAP server 12. The MAP middleware component 70 is implemented in software and performs the operations needed for the MAP client 30-1 to operate as an interface between the MAP application 32-1 and the third-party applications 34-1 at the mobile device 18-1 and the MAP server 12. The mobile client/server protocol component 72 enables communication between the MAP client 30-1 and the MAP server 12 via a defined protocol.

Using the current locations of the users 20-1 through 20-N and the user profiles of the users 20-1 through 20-N, the MAP server 12 can provide a number of features. A first feature that may be provided by the MAP server 12 is historical storage of anonymized user profile data by location, which, as discussed below, can be utilized to provide historical aggregate profiles for desired locations or areas. This historical storage of anonymized user profile data by location is performed by the history manager 58 of the MAP server 12. More specifically, as illustrated in FIG. 4, in the preferred embodiment, the history manager 58 maintains lists of users located in a number of geographic regions, or "location buckets." Preferably, the location buckets are defined by floor(latitude, longitude) to a desired resolution. The higher the resolution, the smaller the size of the location buckets. For example, in one embodiment, the location buckets are defined by floor(latitude, longitude) to a resolution of $1/10,000^{th}$ of a degree such that the lower left-hand corners of the squares illustrated in FIG. 4 are defined by the floor(latitude, longitude) values at a resolution of $1/10,000^{th}$ of a degree. In the example of FIG. 4, users are represented as dots, and location buckets 74 through 90 have lists of 1, 3, 2, 1, 1, 2, 1, 2, and 3 users, respectively.

As discussed below in detail, at a predetermined time interval such as, for example, 15 minutes, the history manager 58 makes a copy of the lists of users in the location buckets, anonymizes the user profiles of the users in the lists to provide anonymized user profile data for the corresponding location buckets, and stores the anonymized user profile data in a number of history objects. In one embodiment, a history object is stored for each location bucket having at least one user. In another embodiment, a quadtree algorithm is used to efficiently create history objects for geographic regions (i.e., groups of one or more adjoining location buckets).

FIG. 5 graphically illustrates a scenario where a user moves from one location bucket to another, namely, from the location bucket 76 to the location bucket 78. As discussed below in detail, assuming that the movement occurs during the time interval between persistence of the historical data by the history manager 58, the user is included on both the list for the location bucket 76 and the list for the location bucket 78. However, the user is flagged or otherwise marked as inactive for the location bucket 76 and active for the location bucket 78. As discussed below, after making a copy of the lists for the location buckets to be used to persist the historical data, users flagged as inactive are removed from the lists of users for the location buckets. Thus, in sum, once a user moves from the location bucket 76 to the location bucket 78, the user remains in the list for the location bucket 76 until the predetermined time interval has expired and the anonymized user profile data is persisted. The user is then removed from the list for the location bucket 76.

FIG. 6 is a flow chart illustrating the operation of a foreground "bucketization" process performed by the history manager 58 to maintain the lists of users for location buckets according to one embodiment of the present disclosure. First, the history manager 58 receives a location update for a user (step 1000). For this discussion, assume that the location update is received for the user 20-1. The history manager 58 then determines a location bucket corresponding to the updated location (i.e., the current location) of the user 20-1 (step 1002). In the preferred embodiment, the location of the user 20-1 is expressed as latitude and longitude coordinates, and the history manager 58 determines the location bucket by determining floor values of the latitude and longitude coordinates, which can be written as floor(latitude, longitude) at a desired resolution. As an example, if the latitude and longitude coordinates for the location of the user 20-1 are 32.24267381553987 and −111.9249213502935, respectively, and the floor values are to be computed to a resolution of $1/10,000^{th}$ of a degree, then the floor values for the latitude and longitude coordinates are 32.2426 and −111.9249. The floor values for the latitude and longitude coordinates correspond to a particular location bucket.

After determining the location bucket for the location of the user 20-1, the history manager 58 determines whether the user 20-1 is new to the location bucket (step 1004). In other words, the history manager 58 determines whether the user 20-1 is already on the list of users for the location bucket. If the user 20-1 is new to the location bucket, the history manager 58 creates an entry for the user 20-1 in the list of users for the location bucket (step 1006). Returning to step 1004, if the user 20-1 is not new to the location bucket, the history manager 58 updates the entry for the user 20-1 in the list of users for the location bucket (step 1008). At this point, whether proceeding from step 1006 or 1008, the user 20-1 is flagged as active in the list of users for the location bucket (step 1010).

The history manager 58 then determines whether the user 20-1 has moved from another location bucket (step 1012). More specifically, the history manager 58 determines whether the user 20-1 is included in the list of users for another location bucket and is currently flagged as active in that list. If the user 20-1 has not moved from another location bucket, the process proceeds to step 1016. If the user 20-1 has moved from another location bucket, the history manager 58 flags the user 20-1 as inactive in the list of users for the other location bucket from which the user 20-1 has moved (step 1014).

At this point, whether proceeding from step 1012 or 1014, the history manager 58 determines whether it is time to persist (step 1016). More specifically, as mentioned above, the history manager 58 operates to persist history objects at a predetermined time interval such as, for example, every 15 minutes. Thus, the history manager 58 determines that it is time to persist if the predetermined time interval has expired. If it is not time to persist, the process returns to step 1000 and is repeated for a next received location update, which will typically be for another user. If it is time to persist, the history manager 58 creates a copy of the lists of users for the location buckets and passes the copy of the lists to an anonymization and storage process (step 1018). In this embodiment, the anonymization and storage process is a separate process performed by the history manager 58. The history manager 58 then removes inactive users from the lists of users for the location buckets (step 1020). The process then returns to step 1000 and is repeated for a next received location update, which will typically be for another user.

FIG. 7 is a flow chart illustrating the anonymization and storage process performed by the history manager 58 at the predetermined time interval according to one embodiment of the present disclosure. First, the anonymization and storage process receives the copy of the lists of users for the location buckets passed to the anonymization and storage process by the bucketization process of FIG. 6 (step 1100). Next, anonymization is performed for each of the location buckets having at least one user in order to provide anonymized user profile data for the location buckets (step 1102). Anonymization prevents connecting information stored in the history objects stored by the history manager 58 back to the users 20-1 through 20-N or at least substantially increases a difficulty of connecting information stored in the history objects stored by the history manager 58 back to the users 20-1 through 20-N. Lastly, the anonymized user profile data for the location buckets is stored in a number of history objects (step 1104). In one embodiment, a separate history object is stored for each of the location buckets, where the history object of a location bucket includes the anonymized user profile data for the location bucket. In another embodiment, as discussed below, a quadtree algorithm is used to efficiently store the anonymized user profile data in a number of history objects such that each history object stores the anonymized user profile data for one or more location buckets.

FIG. 8 graphically illustrates one embodiment of the anonymization process of step 1102 of FIG. 7. In this embodiment, anonymization is performed by creating anonymous user records for the users in the lists of users for the location buckets. The anonymous user records are not connected back to the users 20-1 through 20-N. More specifically, as illustrated in FIG. 8, each user in the lists of users for the location buckets has a corresponding user record 92 that is stored in the datastore 66 of the MAP server 12. The user record 92 includes a unique user identifier (ID) for the user, the current location of the user, and the user profile of the user. In general, the user profile of the user includes data that is indicative of one or more interests of the user. More specifically, in this embodiment, the user profile of the user includes keywords for each of a number of profile categories, which are stored in corresponding profile category records 94-1 through 94-M. Each of the profile category records 94-1 through 94-M includes a user ID for the corresponding user which may be the same user ID used in the user record 92, a category ID, and a list of keywords for the profile category.

For anonymization, an anonymous user record 96 is created from the user record 92. In the anonymous user record 96, the user ID is replaced with a new user ID that is not connected back to the user, which is also referred to herein as an anonymous user ID. This new user ID is different than any other user ID used for anonymous user records created from the user record of the user for any previous or subsequent time periods. In this manner, anonymous user records for a single user created over time cannot be linked to one another.

In addition, anonymous profile category records 98-1 through 98-M are created for the profile category records 94-1 through 94-M. In the anonymous profile category records 98-1 through 98-M, the user ID is replaced with a new user ID, which may be the same new user ID included in the anonymous user record 96. The anonymous profile category records 98-1 through 98-M include the same category IDs and lists of keywords as the corresponding profile category records 94-1 through 94-M. Note that the location of the user is not stored in the anonymous user record 96. With respect to location, it is sufficient that the anonymous user record 96 is linked to a location bucket.

In another embodiment, the history manager 58 performs anonymization in a manner similar to that described above with respect to FIG. 8. However, in this embodiment, the profile category records for the group of users in a location bucket, or the group of users in a number of location buckets representing a node in a quadtree data structure (see below), may be selectively randomized among the anonymous user records of those users. In other words, each anonymous user record would have a user profile including a selectively randomized set of profile category records (including keywords) from a cumulative list of profile category records for all of the users in the group.

In yet another embodiment, rather than creating anonymous user records 96 for the users in the lists maintained for the location buckets, the history manager 58 may perform anonymization by storing an aggregate user profile for each location bucket, or each group of location buckets representing a node in a quadtree data structure (see below). The aggregate user profile may include a list of all keywords and potentially the number of occurrences of each keyword in the user profiles of the corresponding group of users. In this manner, the data stored by the history manager 58 is not connected back to the users 20-1 through 20-N.

FIG. 9 is a flow chart illustrating the storing step (step 1104) of FIG. 7 in more detail according to one embodiment of the present disclosure. First, the history manager 58 processes the location buckets using a quadtree algorithm to produce a quadtree data structure, where each node of the quadtree data structure includes one or more of the location buckets having a combined number of users that is at most a predefined maximum number of users (step 1200). The history manager 58 then stores a history object for each node in the quadtree data structure having at least one user (step 1202).

Each history object includes location information, timing information, data, and quadtree data structure information. The location information included in the history object defines a combined geographic area of the location bucket(s) forming the corresponding node of the quadtree data structure. For example, the location information may be latitude and longitude coordinates for a northeast corner of the combined geographic area of the node of the quadtree data structure and a southwest corner of the combined geographic area for the node of the quadtree data structure. The timing information includes information defining a time window for the history object, which may be, for example, a start time for the corresponding time interval and an end time for the corresponding time interval. The data includes the anonymized user profile data for the users in the list(s) maintained for the location bucket(s) forming the node of the quadtree data structure for which the history object is stored. In addition, the data may include a total number of users in the location bucket(s) forming the node of the quadtree data structure. Lastly, the quadtree data structure information includes information defining a quadtree depth of the node in the quadtree data structure.

FIG. 10 is a flow chart illustrating a quadtree algorithm that may be used to process the location buckets to form the quadtree data structure in step 1200 of FIG. 9 according to one embodiment of the present disclosure. Initially, a geographic area served by the MAP server 12 is divided into a number of geographic regions, each including multiple location buckets. These geographic regions are also referred to herein as base quadtree regions. The geographic area served by the MAP server 12 may be, for example, a city, a state, a country, or the like. Further, the geographic area may be the only geographic area served by the MAP server 12 or one of a number of geographic areas served by the MAP server 12. Preferably, the base quadtree regions have a size of $2^n \times 2^n$ location buckets, where n is an integer greater than or equal to 1.

In order to form the quadtree data structure, the history manager 58 determines whether there are any more base quadtree regions to process (step 1300). If there are more base quadtree regions to process, the history manager 58 sets a current node to the next base quadtree region to process, which for the first iteration is the first base quadtree region (step 1302). The history manager 58 then determines whether the number of users in the current node is greater than a predefined maximum number of users and whether a current quadtree depth is less than a maximum quadtree depth (step 1304). In one embodiment, the maximum quadtree depth may be reached when the current node corresponds to a single location bucket. However, the maximum quadtree depth may be set such that the maximum quadtree depth is reached before the current node reaches a single location bucket.

If the number of users in the current node is greater than the predefined maximum number of users and the current quadtree depth is less than a maximum quadtree depth, the history manager 58 creates a number of child nodes for the current node (step 1306). More specifically, the history manager 58 creates a child node for each quadrant of the current node. The users in the current node are then assigned to the appropriate child nodes based on the location buckets in which the users are located (step 1308), and the current node is then set to the first child node (step 1310). At this point, the process returns to step 1304 and is repeated.

Once the number of users in the current node is not greater than the predefined maximum number of users or the maximum quadtree depth has been reached, the history manager 58 determines whether the current node has any more sibling nodes (step 1312). Sibling nodes are child nodes of the same parent node. If so, the history manager 58 sets the current node to the next sibling node of the current node (step 1314), and the process returns to step 1304 and is repeated. Once there are no more sibling nodes to process, the history manager 58 determines whether the current node has a parent node (step 1316). If so, since the parent node has already been processed, the history manager 58 determines whether the parent node has any sibling nodes that need to be processed (step 1318). If not, the process returns to step 1300 and is repeated. If the parent node has any sibling nodes that need to be processed, the history manager 58 sets the next sibling node of the parent node to be processed as the current node (step 1320). From this point, the process returns to step 1304 and is repeated. Returning to step 1316, if the current node does not have a parent node, the process returns to step 1300 and is repeated until there are no more base quadtree regions to process. Once there are no more base quadtree regions to process, the finished quadtree data structure is returned to the process of FIG. 9 such that the history manager 58 can then store the history objects for nodes in the quadtree data structure having at least one user (step 1322).

Figure 11A:
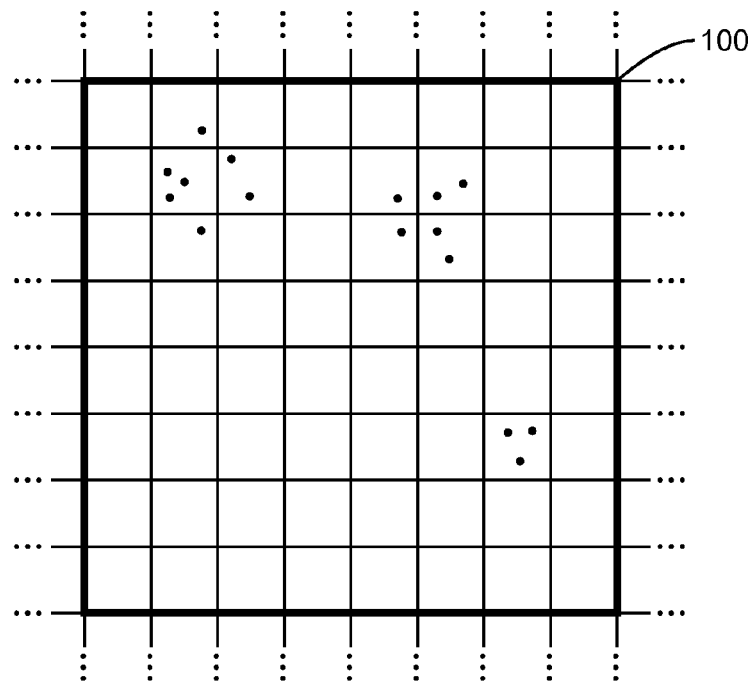
Figure 11B:
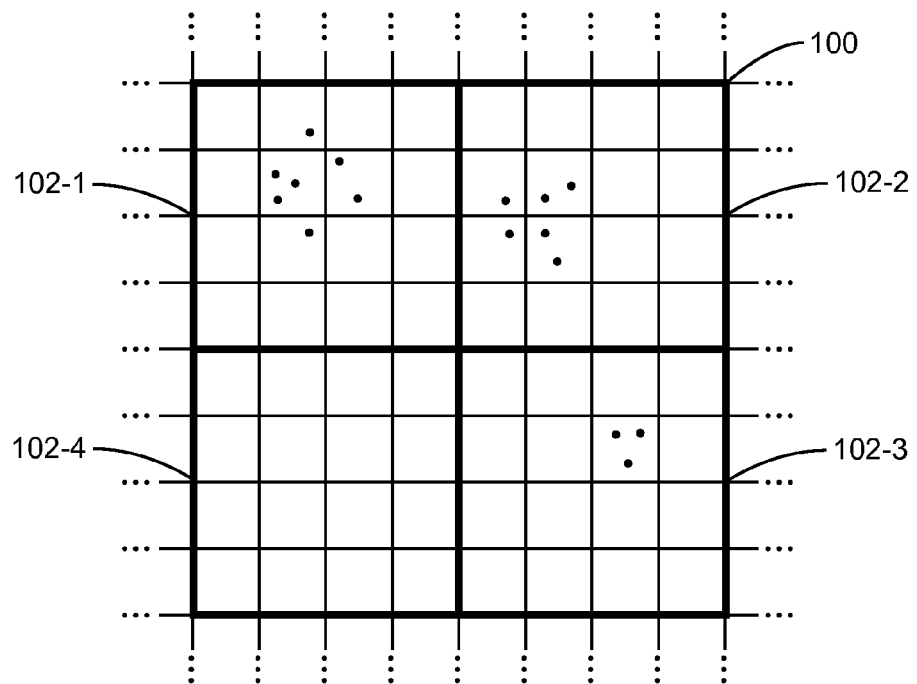

FIGS. 11A through 11E graphically illustrate the process of FIG. 10 for the generation of the quadtree data structure for one exemplary base quadtree region 100. FIG. 11A illustrates the base quadtree region 100. As illustrated, the base quadtree region 100 is an 8×8 square of location buckets, where each of the small squares represents a location bucket. First, the history manager 58 determines whether the number of users in the base quadtree region 100 is greater than the predetermined maximum number of users. In this example, the predetermined maximum number of users is 3. Since the number of users in the base quadtree region 100 is greater than 3, the history manager 58 divides the base quadtree region 100 into four child nodes 102-1 through 102-4, as illustrated in FIG. 11B.

Figure 11C:
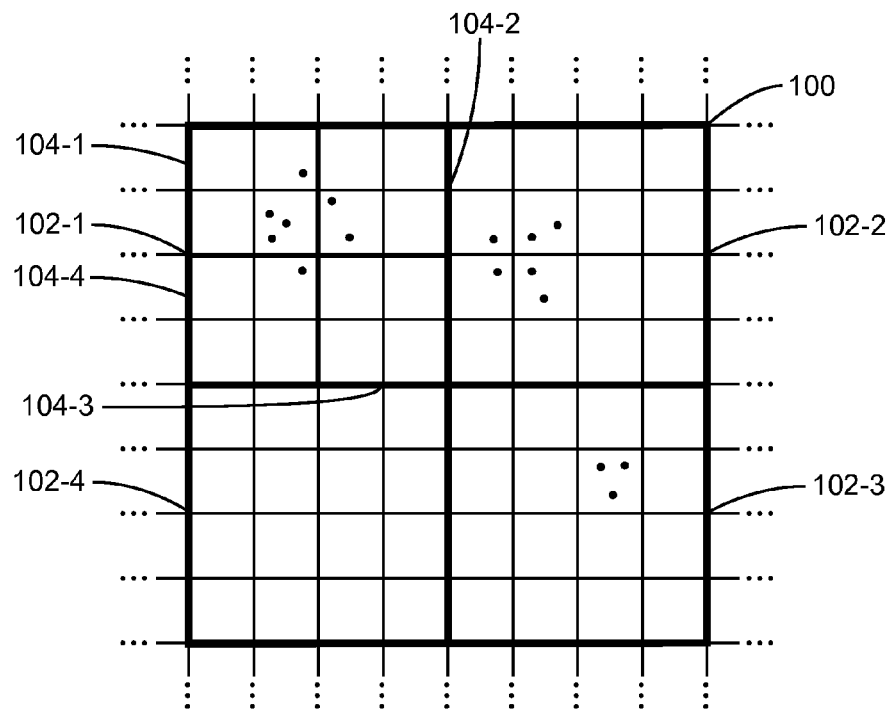
Figure 11D:
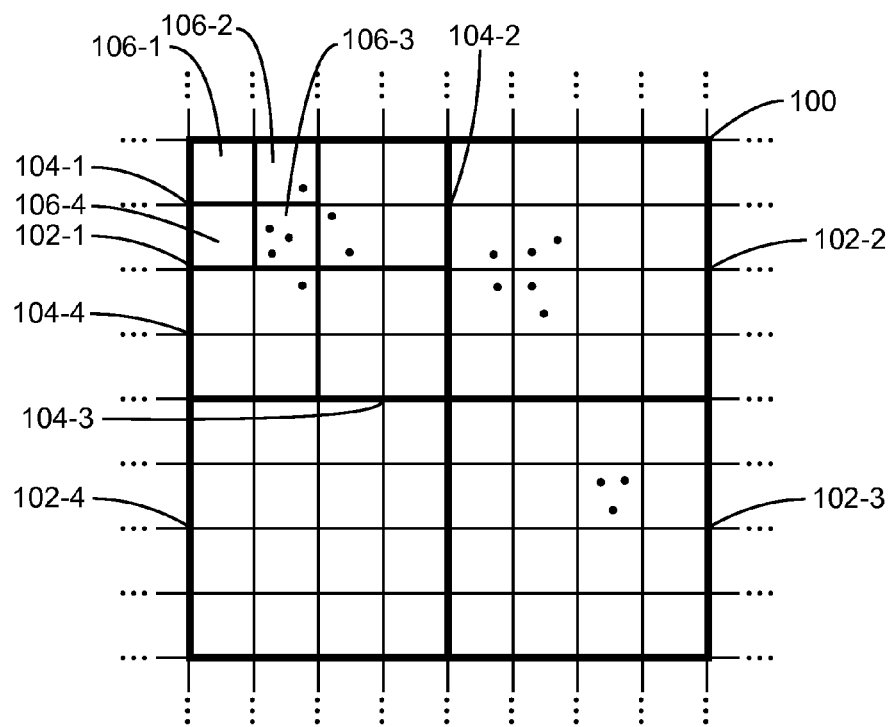

Next, the history manager 58 determines whether the number of users in the child node 102-1 is greater than the predetermined maximum, which again for this example is 3. Since the number of users in the child node 102-1 is greater than 3, the history manager 58 divides the child node 102-1 into four child nodes 104-1 through 104-4, as illustrated in FIG. 11C. The child nodes 104-1 through 104-4 are children of the child node 102-1. The history manager 58 then determines whether the number of users in the child node 104-1 is greater than the predetermined maximum number of users, which again is 3. Since there are more than 3 users in the child node 104-1, the history manager 58 further divides the child node 104-1 into four child nodes 106-1 through 106-4, as illustrated in FIG. 11D.

The history manager 58 then determines whether the number of users in the child node 106-1 is greater than the predetermined maximum number of users, which again is 3. Since the number of users in the child node 106-1 is not greater than the predetermined maximum number of users, the child node 106-1 is identified as a node for the finished quadtree data structure, and the history manager 58 proceeds to process the sibling nodes of the child node 106-1, which are the child nodes 106-2 through 106-4. Since the number of users in each of the child nodes 106-2 through 106-4 is less than or equal to the predetermined maximum number of users, the child nodes 106-2 through 106-4 are also identified as nodes for the finished quadtree data structure.

Once the history manager 58 has finished processing the child nodes 106-1 through 106-4, the history manager 58 identifies the parent node of the child nodes 106-1 through 106-4, which in this case is the child node 104-1. The history manager 58 then processes the sibling nodes of the child node 104-1, which are the child nodes 104-2 through 104-4. In this example, the number of users in each of the child nodes 104-2 through 104-4 is less than the predetermined maximum number of users. As such, the child nodes 104-2 through 104-4 are identified as nodes for the finished quadtree data structure.

Figure 11E:
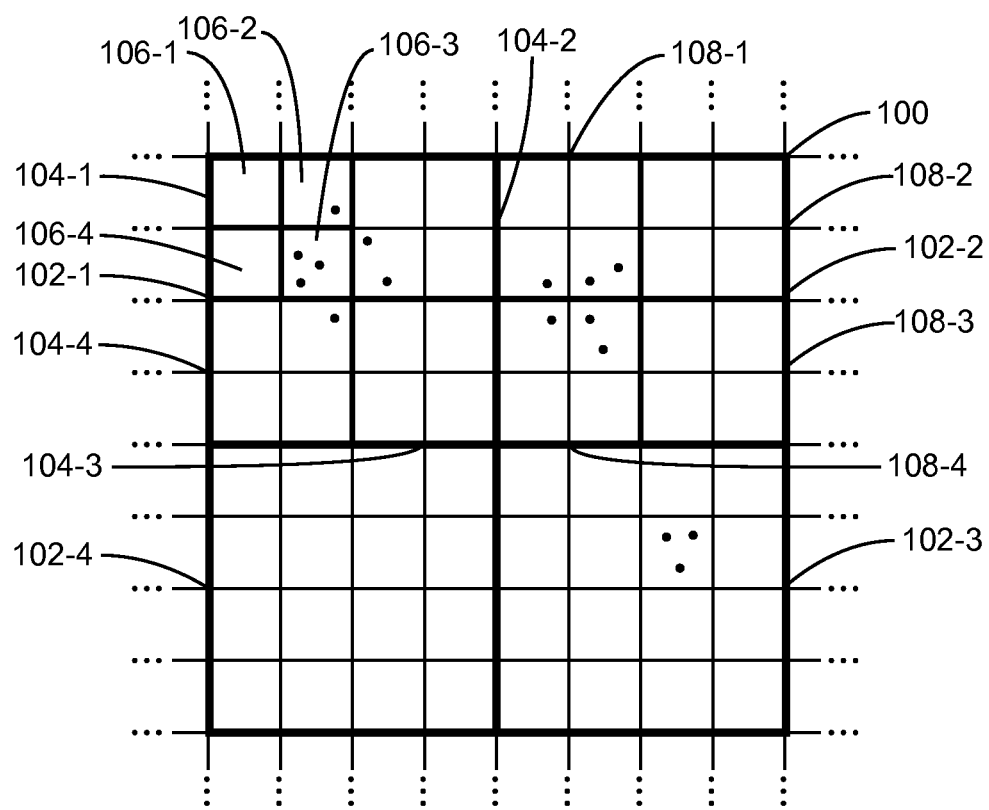

Once the history manager 58 has finished processing the child nodes 104-1 through 104-4, the history manager 58 identifies the parent node of the child nodes 104-1 through 104-4, which in this case is the child node 102-1. The history manager 58 then processes the sibling nodes of the child node 102-1, which are the child nodes 102-2 through 102-4. More specifically, the history manager 58 determines that the child node 102-2 includes more than the predetermined maximum number of users and, as such, divides the child node 102-2 into four child nodes 108-1 through 108-4, as illustrated in FIG. 11E. Because the number of users in each of the child nodes 108-1 through 108-4 is not greater than the predetermined maximum number of users, the child nodes 108-1 through 108-4 are identified as nodes for the finished quadtree data structure. Then, the history manager 58 proceeds to process the child nodes 102-3 and 102-4. Since the number of users in each of the child nodes 102-3 and 102-4 is not greater than the predetermined maximum number of users, the child nodes 102-3 and 102-4 are identified as nodes for the finished quadtree data structure. Thus, at completion, the quadtree data structure for the base quadtree region 100 includes the child nodes 106-1 through 106-4, the child nodes 104-2 through 104-4, the child nodes 108-1 through 108-4, and the child nodes 102-3 and 102-4, as illustrated in FIG. 11E.

As discussed above, the history manager 58 stores a history object for each of the nodes in the quadtree data structure including at least one user. As such, in this example, the history manager 58 stores history objects for the child nodes 106-2 and 106-3, the child nodes 104-2 and 104-4, the child nodes 108-1 and 108-4, and the child node 102-3. However, no history objects are stored for the nodes that do not have any users (i.e., the child nodes 106-1 and 106-4, the child node 104-3, the child nodes 108-2 and 108-3, and the child node 102-4).

FIG. 12 is a flow chart illustrating the operation of the profile creation function 40 according to one embodiment of the present disclosure. First, the profile creation function 40 obtains user information from a subject user that identifies one or more sources for previous locations of the subject user and one or more sources for user interests of the subject user (step 1400). In one embodiment, the subject user is one of the users 20-1 through 20-N. Using the user 20-1 as an example, the user information identifying the sources of the previous locations and user interests of the user 20-1 is obtained from the user 20-1 via the MAP application 32-1 of the mobile device 18-1. In another embodiment, the subject user is the subscriber 24 of the subscriber device 22, and the user information is obtained from the subscriber 24 via the web browser 38 of the subscriber device 22. In another embodiment, the subject user may be a user associated with one of the profile servers 14, and the user information is obtained from the subject user via a corresponding device (e.g., a computer, a mobile device, or the like). In yet another embodiment, the subject user may be a user associated with the third-party server 26, and the user information is obtained from the subject user via the third-party server 26 or a device associated with the subject user.

The sources for the previous locations of the subject user may generally include any source of previous locations of the subject user and corresponding times at which the subject user was located at those previous locations. For example, the sources for the previous locations of the subject user may be the location server 16, a mobile telecommunications service provider of the subject user, a network node(s) maintaining a historical record of network accesses made by a mobile device of the subject user, an electronic calendar maintained by or for the subject user, a financial institution providing financial services to the subject user, or the like. Regarding the location server 16, the user information may include credentials (e.g., a username and/or password) that enable the profile creation function 40 to access previous locations stored by the location server 16 for the subject user and times at which the subject user was at those previous locations. Regarding the mobile telecommunications service provider, as will be appreciated by one having ordinary skill in the art, the mobile telecommunications service provider typically maintains a record of data that is or can be used to derive previous locations at which the subject user was located and times at which the subject user was at those previous locations. As such, the user information may include credentials (e.g., a username and/or password) that enable the profile creation function 40 to access the mobile telecommunications service provider of the subject user to obtain information defining a number of previous locations of the subject user and times at which the subject user was at those previous locations.

In a similar manner, one or more network nodes may track wireless Local Area Network (LAN) access points (e.g., WiFi hotspots) at which a mobile device of the subject user has accessed the network 28. Locations of such LAN access points are known via services such as Skyhook Wireless. As such, the user information may include information enabling the profile creation function 40 to obtain information defining LAN access points from which the mobile device of the subject user has accessed the network 28 and the times of those network accesses. The profile creation function 40 may then obtain the locations of the LAN access points and store those locations as previous locations of the subject user.

A financial institution of the subject user maintains records of financial transactions (e.g., credit card payments) conducted by the subject user as well as locations at which the financial transactions were conducted and times at which the financial transactions were conducted. As such, the user information may include information that enables the profile creation function 40 to obtain previous locations of the subject user and times at which the subject user was at those previous locations from the financial institution.

The one or more sources of previous locations of the subject user may additionally or alternatively include geo-tagged content associated with the subject user. The geo-tagged content may be, for example, geo-tagged electronic correspondence such as emails, text-messages, tweets, or the like that have been tagged with the location of the subject user at the time of sending the electronic correspondence. As another example, the geo-tagged content may be digital pictures captured by a digital camera of the subject user that is equipped with a GPS receiver and that tags the digital pictures with locations and times at which the digital pictures were captured by the digital camera. As such, the user information may include information enabling the profile creation function 40 to obtain the previous locations of the subject user and corresponding times at which the subject user was at those locations using geo-tags applied to content associated with the subject user. In a similar manner, content (e.g., pictures or videos) associated with the subject user may be analyzed to determine locations at which the content was created, where the determined locations can be combined with times at which the content was created to provide previous locations of the subject user and times at which the subject user was at those previous locations.

The one or more sources of the user interests of the subject user may be, for example, one or more of the profile servers 14 or one or more websites. More specifically, the user information may include credentials (e.g., username and/or password) enabling the profile creation function 40 to access a user profile of the subject user from one or more social networking services (e.g., Facebook®, MySpace®, LinkedIn®, or the like) hosted by the one or more profile servers 14. Interests of the subject user may then be extracted from the user profile(s) of the subject user obtained from such sources. In addition or alternatively, the user information may include Uniform Resource Locators (URLs) of one or more websites that may be crawled or otherwise analyzed to determine interests of the subject user.

In addition to or as an alternative to identifying one or more sources for the previous locations and user interests of the subject user, the user information may include information manually entered by the subject user that defines one or more previous locations of the subject user and corresponding times at which the subject user was at those previous locations. Likewise, the user information may include information manually entered by the subject user that defines one or more interests of the subject user.

Next, the profile creation function 40 obtains information regarding the previous locations and interests of the subject user from the identified sources (step 1402). More specifically, for each identified source of previous locations of the subject user, the profile creation function 40 obtains information from the identified source that defines previous locations of the subject user and corresponding times at which the subject user was at those previous locations. For each identified source of user interests for the subject user, the profile creation function 40 obtains information representative of user interests of the subject user from the source and then normalizes the information into a set of interests, or keywords, recognized by the MAP server 12.

The profile creation function 40 then generates a list of location and time period pairs for the subject user (step 1404). Each location and time period pair defines a previous location of the subject user and a time period during which the subject user was at the previous location. The previous location of the subject user may be expressed as a specific geographic location such as, for example, geographic coordinates, or as a geographic area such as, for example, a geographic area defined as a predefined maximum distance from a specific geographic location. In order to generate the list of location and time period pairs, the profile creation function 40 analyzes information obtained from the identified sources of previous locations of the subject user. The manner in which the information is analyzed may vary depending on the source of the information.

In one embodiment, a source of the previous locations of the subject user may provide a location history of the subject user that includes a list of geographic coordinates and corresponding timestamps defining times at which the subject user was located at the locations defined by the geographic coordinates. In this case, the profile creation function 40 may analyze the location history of the subject user to provide a number of corresponding location and time period pairs. Assuming that the location history includes frequent location updates for the subject user, during the analysis, the profile creation function 40 may identify groups of entries in the location history that are adjacent in time and have locations within a defined degree of tolerance from one another. Each identified group may be used to define a location and time period pair. The location for the location and time period pair may be an average or center of mass of the geographic coordinates for the entries in the group or a geographic area encompassing all of the geographic coordinates for the entries in the group. The time period for the location and time period pair may be a time period starting at an earliest timestamp of the entries in the group and ending at a latest timestamp of the entries in the group. When determining the time period for the location and time period pair, an amount of time it would take to travel from the location for the last entry (in time) for the group to the location for the first entry for the next group of entries in the location history may also be considered. For example, the time period may be extended based on the amount of time it would take to travel from the location for the last entry (in time) for the group to the location for the first entry for the next group of entries in the location history.

In another embodiment, a location and time period pair is generated from information defining a single previous location of the subject user and a corresponding time at which the subject user was at the previous location. If the timing information provided from the source is precise (e.g., a specific time on a specific date), then the profile creation function 40 may create the location and time period pair by setting the location of the location and time period pair to the previous location of the subject user as defined by the information from the source. The time period for the location and time period pair may then be defined as a time period that extends a predefined amount of time before and after the precise time identified in the information from the source. For example, if the precise time identified in the information from the source is 11:30 AM on a particular day, the time period for the location and time period pair may be 10:30 AM to 12:30 PM on the particular day. In contrast, if the timing information from the source is imprecise (e.g., a specific date with no time of day), the profile creation function 40 may create the location and time period pair by setting the location of the location and time period pair to the previous location of the subject user as defined by the information from the source and the time period for the location and time period pair to a time period corresponding to the imprecise timing information from the source (e.g., 12:00 AM to 12:00 PM on the specific date identified in the information from the source).

The profile creation function 40 also generates a list of weighted user interests for the subject user (step 1406). As discussed above, in one embodiment, the profile creation function 40 obtains information representing user interests of the subject user from the one or more identified sources and then normalizes the information into a number of keywords recognized by the MAP server 12 and representing the user interests of the subject user. Weights are preferably assigned to the user interests of the subject user. For example, for each user interest, a weight may be assigned to the user interest based on a number of occurrences of the user interest in the information obtained from the one or more sources. For example, if the sources include a single website, keyword analysis may be performed on the website to extract one or more keywords expressing user interests of the subject user, where weights are assigned to those keywords based on the number of occurrences of those keywords in the website.

Next, the profile creation function 40 obtains historical aggregate profile data for each location and time period pair (step 1408). As described below in detail, the profile creation function 40 sends a historical request to the aggregation engine 62 of the MAP server 12 for each location and time period pair. For each location and time period pair, the aggregation engine 62 aggregates the anonymized user profile data stored in historical records that are relevant to the location and time period pair to provide historical aggregate profile data for the location and time period pair. In the preferred embodiment, the time period is divided into a number of sub-bands, and the historical aggregate profile data for the location and time period pair includes a historical aggregate profile for each of the sub-bands. The historical aggregate profile for a sub-band includes a list of keywords, or interests, appearing in the user profiles stored in the historical records that are relevant to the location and sub-band (i.e., the user profiles that contributed to the historical aggregate profile for the sub-band). In addition, for each keyword in the list, the historical aggregate profile preferably includes a representation value that is indicative of a degree to which the keyword is represented, or included, in the user profiles from the relevant historical records that contributed to the historical aggregate profile. In one embodiment, for each keyword in the list, the representation value is a number of occurrences, or user matches, for the keyword in the user profiles stored in the historical records that are relevant to the location and sub-band. In another embodiment, for each keyword in the list, the representation value is a ratio of a number of occurrences for the keyword in the user profiles stored in the historical records that are relevant to the location and sub-band to a total number of users for the historical records that are relevant to the location and sub-band.

The profile creation function 40 then processes the historical aggregate profile data to provide a consolidated profile for each location and time period pair (step 1410). More specifically, for each location and time period pair, the historical aggregate profile data for the location and time period pair is consolidated, or combined, to provide a consolidated profile for the location and time period pair. The profile creation function 40 then merges similar consolidated profiles from the consolidated profiles created for the location and time period pairs to thereby provide one or more unique profiles (step 1412). The profile creation function 40 then creates a user profile for the subject user based on one or more of the unique profiles (step 1414). In one embodiment, the profile creation function 40 automatically selects one of the unique profiles as the user profile of the subject user. For example, the profile creation function 40 may obtain an aggregate profile of a crowd of users in which the subject user is currently located from the MAP server 12. The profile creation function 40 may then select one of the unique profiles created in step 1412 that is most similar to the aggregate profile of the crowd of users in which the subject user is currently located as the user profile of the subject user. In another embodiment, the profile creation function 40 enables the subject user to select one of the unique profiles as his or her user profile. In another embodiment, the profile creation function 40 enables the subject user to modify one of the unique profiles to provide his or her user profile. In yet another embodiment, the profile creation function 40 enables the subject user to combine one or more of the unique profiles or subsets of one or more of the unique profiles to provide his or her user profile. At this point, the user profile of the subject user may be stored or otherwise utilized.

FIG. 13 is a flow chart illustrating the operation of the profile creation function 40 to process the historical aggregate profile data for a location and time period pair for the subject user in step 1410 of FIG. 12 according to one embodiment of the present disclosure. In this embodiment, the historical aggregate profile data for the location and time period pair includes a historical aggregate profile for each of a number of sub-bands within the time period for the location and time period pair. First, the profile creation function 40 gets the next sub-band of the time period for the location and time period pair (step 1500). The profile creation function 40 then determines a relevancy rating for the sub-band (step 1502).

The relevancy rating of the sub-band may depend on how the time period for the location and time period pair was defined, a degree of similarity between the historical aggregate profile for the sub-band and the user interests of the subject user, a degree of similarity between additional descriptive information for the location of the location and time period pair and the user interests of the subject user, or a combination thereof. Note that the manner in which the time period was defined preferably influences the relevancy rating of the sub-band more than the degree of similarity between the historical aggregate profile for the sub-band and the user interests of the subject user and the degree of similarity between additional descriptive information for the location of the location and time period pair and the user interests of the subject user. Similarly, the degree of similarity between the historical aggregate profile for the sub-band and the user interests of the subject user preferably influences the relevancy rating of the sub-band more than the degree of similarity between additional descriptive information for the location of the location and time period pair and the user interests of the subject user.

More specifically, in one embodiment, if the time period for the location and time period pair was manually defined by the subject user, then the sub-bands within the time period are assigned a higher relevancy rating than sub-bands for time periods that were not manually defined by the subject user. In addition, if the time period is imprecise in that the subject user was not likely at the corresponding location for the entire time period, the profile creation function 40 may first determine a time or subset of the time period during which it is most likely that the subject user was at the corresponding location. The time or subset of the time period during which it is most likely that the subject user was at the corresponding location may be determined based on, for example, a comparison of additional information known about the location and, possibly, the user interests of the subject user. For example, if the time period is a particular week and the location is a location at which different types of events (e.g., concerts, sporting events, etc.) are held, types of events held at the location during the particular week may be determined and compared to the user interests of the subject user. Based on the comparison, the profile creation function 40 can determine the particular day during the week and possibly a particular time period within a particular day during which the subject user was most likely to be at the location. Then, the sub-bands of the time period for the location and time period pair corresponding to the time during which the subject user was most likely at the location are assigned a higher relevancy rating than the other sub-bands in the time period. Still further, if the time period for the location and time period pair is a time period encompassing a specific time at which it is known that the subject user was at the location, then the sub-band that includes the specific time at which it is known that the subject user was at the location is given a greater relevancy rating than the other sub-bands. In addition, the relevancy ratings of the sub-bands may decrease as they move out from the sub-band that includes the specific time at which it is known that the subject user was at the location.

The relevancy rating of the location and time period pair may also depend on the similarity of the location and time period pair to other location and time period pairs. If the one or more sub-bands within the time period for the location and time period pair are the same as one or more sub-bands within a time period of another location and time period pair having the same or substantially the same location, then the relevancy rating(s) of the one or more sub-bands within the time period for the location and time period pair may be adjusted accordingly. For example, if the other location and time period pair has a narrower time period and was manually defined by the subject user, then the relevancy ratings of the one or more sub-bands within the time period of the location and time period pair may be increased as compared to the relevancy ratings of the other sub-bands within the time period for the location and time period pair (e.g., set to a maximum value).

Next, the profile creation function 40 determines whether a relevancy rating has been determined for the last sub-band in the time period for the location and time period pair (step 1504). If not, the process returns to step 1500 and is repeated for the next sub-band. Once relevancy ratings have been determined for all of the sub-bands, the profile creation function 40 sorts the historical aggregate profiles for the sub-bands according to the relevancy ratings of the sub-bands to provide a sorted list of historical aggregate profiles for the location and time period pair (step 1506). Note that step 1506 is optional.

The profile creation function 40 then gets the relevancy rating for the next historical aggregate profile in the sorted list of historical aggregate profiles for the location and time period pair (step 1508). The relevancy rating for the historical aggregate profile is the relevancy rating determined for the sub-band for which the historical aggregate profile has been provided. Next, the profile creation function 40 determines whether the relevancy rating for the historical aggregate profile is greater than or equal to a predefined cut-off value (step 1510). The predefined cut-off value is a minimum relevancy rating required before a historical aggregate profile for a sub-band contributes to the consolidated profile for the location and time period pair. In one embodiment, the predefined cut-off value may vary depending on a highest relevancy rating for all of the sub-bands of the time period for the location and time period pair, a number of sub-bands in the time period for the location and time period pair, or both. For instance, the predefined cut-off value may decrease as the highest relevancy rating for all of the sub-bands decreases and increase as the number of sub-bands increases. If the relevancy rating is less than the predefined cut-off value, the process proceeds to step 1516. If the relevancy rating is greater than or equal to the predefined cut-off value, the profile creation function 40 determines whether the relevancy rating is greater than or equal to a predefined threshold value (step 1512). The predefined threshold value is greater than the predefined cut-off value. In one embodiment, the predefined threshold value is half a difference between a maximum relevancy rating and the predefined cut-off value plus the predefined cut-off value.

If the relevancy rating is greater than or equal to the predefined threshold value, the profile creation function 40 merges the complete historical aggregate profile for the sub-band into the consolidated profile for the location and time period pair (step 1514). More specifically, for each keyword, or interest, in the historical aggregate profile for the sub-band, the profile creation function 40 adds the keyword to the consolidated profile if the keyword is not already included in the consolidated profile along with the representation value for the keyword. If the keyword is already included in the consolidated profile, the profile creation function 40 computes an average of, or otherwise combines, the representation value for the keyword from the historical aggregate profile for the sub-band and the representation value for the keyword in the consolidated profile for the location and time period pair. This average, or combined, representation value is then stored as the new representation value for the keyword in the consolidated profile. Thus, the consolidated profile for the location and time period pair is generated to include a list of keywords, or interests, appearing in the historical aggregate profiles for the sub-bands of the time period and, for each keyword, a combined (e.g., average) representation value for the keyword among the historical aggregate profiles for the sub-bands of the time period.

Returning to step 1512, if the relevancy rating is less than the predefined threshold value, the profile creation function 40 merges a subset of the historical aggregate profile for the sub-band into the consolidated profile for the location and time period pair (step 1518). Specifically, the profile creation function 40 only merges keywords, or interests, from the historical aggregate profile for the sub-band that are already included in the consolidated profile for the location and time period pair into the consolidated profile. In one embodiment, when merging interests from the historical aggregate profile into the consolidated profile, the profile creation function 40 computes an average of the representation value for the keyword from the historical aggregate profile for the sub-band and the representation value for the keyword from the consolidated profile. The resulting average is then stored as the representation value for the keyword in the consolidated profile.

At this point, whether proceeding from step 1514 or 1518, the profile creation function 40 determines whether the last historical aggregate profile in the sorted list of historical aggregate profiles for the location and time period pair has been processed (step 1516). If not, the process returns to step 1508 and is repeated for the next historical aggregate profile in the sorted list. Once all of the historical aggregate profiles in the sorted list are processed, the process ends.

FIG. 14 is a flow chart illustrating the operation of the profile creation function 40 to merge similar consolidated profiles from the consolidated profiles for the location and time period pairs for the subject user according to one embodiment of the present disclosure. Specifically, FIG. 14 illustrates step 1412 of FIG. 12 in more detail according to one embodiment of the present disclosure. First, the profile creation function 40 gets the next consolidated profile from the consolidated profiles for the location and time period pairs (step 1600). The profile creation function 40 then determines whether there are more unique profiles for the subject user (step 1602). For the first iteration, there are no unique profiles. If there are no more unique profiles, the profile creation function 40 adds the consolidated profile as a new unique profile for the subject user (step 1604) and then proceeds to step 1614.

Returning to step 1602, if there are more unique profiles, the profile creation function 40 gets the next unique profile for the subject user (step 1606). The profile creation function 40 then determines a degree of similarity between the consolidated profile and the unique profile (step 1608). In one embodiment, the consolidated profile includes a list of keywords, or interests, and corresponding representation values for the keywords, as described above. In a similar manner, the unique profile includes a list of keywords and corresponding representation values for the keywords. The degree of similarity may then be computed based on a number of matching keywords in the consolidated profile and the unique profile and the differences between the representation values for the matching interests. The higher the number of matching keywords and the lower the differences between the representation values for the matching keywords, the higher the degree of similarity. The degree of similarity may additionally or alternatively be a function of a comparison of relative positions of matching keywords in the consolidated and unique profiles in terms of representation values. For instance, if a keyword has the highest representation value in the consolidated profile but has the lowest representation value in the unique profile, then the two profiles may be determined to have a low degree of similarity even if the difference between the representation values for that keyword in the consolidated and unique profiles is small.

The profile creation function 40 then determines whether the degree of similarity is greater than or equal to a predefined cut-off value (step 1610). If not, the process returns to step 1602 and is repeated. Otherwise, the profile creation function 40 merges the consolidated profile into the unique profile (step 1612). When merging the consolidated profile into the unique profile, for each keyword, or interest, in the consolidated profile, the keyword is added to the unique profile if the keyword is not already included in the unique profile along with the representation value for the keyword from the consolidated profile. If the keyword is already included in the unique profile, the profile creation function 40 computes averages of, or otherwise combines, the representation value for the keyword from the consolidated profile and a representation value for the keyword in the unique profile to provide an average, or combined, representation value. The averaged, or combined, representation value is then stored as the new representation value for the keyword in the unique profile. At this point, whether proceeding from step 1604 or 1612, the profile creation function 40 determines whether the last consolidated profile has been processed (step 1614). If not, the process returns to step 1600 and is repeated for the next consolidated profile. Once all of the consolidated profiles for the location and time period pairs for the subject user are processed, the process ends.

FIGS. 15A and 15B illustrate the operation of the MAP server 12 to generate historical aggregate profile data for a location and time period pair generated for a subject user according to one embodiment of the present disclosure. First, upon receiving a historical request from the profile creation function 40 for a location and time period pair, the history manager 58 establishes a bounding box for the historical request (step 1700). In one embodiment, the location in the location and time period pair is a particular location, such as a POI, defined by geographic coordinates, a street address, or the like. In this case, the bounding box for the historical request is a geographic area of a predefined shape and size that encompasses the particular location defined by the location and time period pair (e.g., centered at the particular location defined by the location and time period pair). In another embodiment, the location in the location and time period pair is a geographic area in which case the bounding box corresponds to the geographic area defined by the location and time period pair. Note that while a bounding box is used in this example, other geographic shapes may be used to define a bounding region for the historical request (e.g., a bounding circle). In addition to establishing the bounding box, the history manager 58 establishes a time window for the historical request (step 1702). The time window for the historical request is preferably set to the time period from the location and time period pair.

Next, the history manager 58 obtains history objects relevant to the bounding box and the time window for the historical request from the datastore 66 of the MAP server 12 (step 1704). The relevant history objects are history objects recorded for time periods within or intersecting the time window for the historical request and for locations, or geographic areas, within or intersecting the bounding box for the historical request. The history manager 58 also determines sub-band size (step 1706). In one exemplary embodiment, the sub-band size is $1/10^{th}$ of the amount of time from the start of the time window to the end of the time window for the historical request. For example, if the amount of time in the time window for the historical request is one day, the sub-band size may be set to $1/10^{th}$ of a day, which is 2.4 hours. In an alternative embodiment, the time window for the historical request is divided into a number of sub-bands of a predefined size such as, for example, a number of 30 minute sub-bands.

The history manager 58 then sorts the relevant history objects into the appropriate sub-bands of the time window for the historical request. More specifically, in this embodiment, the history manager 58 creates an empty list for each of the sub-bands of the time window (step 1708). Then, the history manager 58 gets the next history object from the history objects identified in step 1704 as being relevant to the historical request (step 1710) and adds that history object to the list(s) for the appropriate sub-band(s) (step 1712). Note that if the history object is recorded for a time period that overlaps two or more of the sub-bands, then the history object may be added to all of the sub-bands to which the history object is relevant. The history manager 58 then determines whether there are more relevant history objects to sort into the sub-bands (step 1714). If so, the process returns to step 1710 and is repeated until all of the relevant history objects have been sorted into the appropriate sub-bands.

Once sorting is complete, the history manager 58 determines an equivalent depth of the bounding box ($D_{BB}$) within the quadtree data structures used to store the history objects (step 1716). More specifically, the area of the base quadtree region (e.g., the base quadtree region 100) is referred to as $A_{BASE}$. Then, at each depth of the quadtree, the area of the corresponding quadtree nodes is $(1/4)^D * A_{BASE}$. In other words, the area of a child node is $1/4^{th}$ of the area of the parent node of that child node. The history manager 58 determines the equivalent depth of the bounding box ($D_{BB}$) by determining a quadtree depth at which the area of the corresponding quadtree nodes most closely matches an area of the bounding box ($A_{BB}$).

Note that the equivalent quadtree depth of the bounding box ($D_{BB}$) determined in step 1716 is used below in order to efficiently determine the ratios of the area of the bounding box ($A_{BB}$) to areas of the relevant history objects ($A_{HO}$). However, in an alternative embodiment, the ratios of the area of the bounding box ($A_{BB}$) to the areas of the relevant history objects ($A_{HO}$) may be otherwise computed, in which case step 1716 would not be needed.

At this point, the process proceeds to FIG. 15B where the history manager 58 gets the list for the next sub-band of the time window for the historical request (step 1718). The history manager 58 then gets the next history object in the list for the sub-band (step 1720). Next, the history manager 58 sets a relevancy weight for the history object, where the relevancy weight is indicative of a relevancy of the history object to the bounding box (step 1722). For instance, a history object includes anonymized user profile data for a corresponding geographic area. If that geographic area is within or significantly overlaps the bounding box, then the history object will have a high relevancy weight. However, if the geographic area only overlaps the bounding box slightly, then the history object will have a low relevancy weight. In this embodiment, the relevancy weight for the history object is set to an approximate ratio of the area of the bounding box ($A_{BB}$) to an area of the history object ($A_{HO}$) computed based on a difference between the quadtree depth of the history object ($D_{HO}$) and the equivalent quadtree depth of the bounding box ($D_{EQ}$). The quadtree depth of the history object ($D_{HO}$) is stored in the history object. More specifically, in one embodiment, the relevancy weight of the history object is set according to the following:

$$relevancy = \frac{A_{BB}}{A_{HO}} \approx \left(\frac{1}{4}\right)^{D_{HO}-D_{BB}}, \text{ for } D_{HO} > D_{BB}, \text{ and}$$

$$relevancy = 1, \text{ for } D_{HO} \leq D_{BB}.$$

Next, the history manager 58 generates an aggregate profile for the history object (step 1724). In order to generate the aggregate profile for the history object, the history manager 58 compares the user profiles of the anonymous user records stored in the history object to one another. In general, the aggregate profile for the history object includes a list of keywords, or interests, appearing in the user profiles of the anonymous user records in the history object. In addition, the aggregate profile for the history object includes representation values for the keywords in the list of keywords, where the representation values define a degree to which the keywords are represented, or included, in the user profiles of the anonymous user records in the history object. In one embodiment, the representation value for each keyword includes a number of user matches, or number of occurrences, for the keyword in the user profiles of the anonymous user records in the historical record. In another embodiment, the representation value for each keyword includes a ratio of a number of user matches, or number of occurrences, for the keyword to a total number of anonymous users in the historical record.

The history manager 58 then determines whether there are more history objects in the list for the sub-band (step 1726). If so, the process returns to step 1720 and is repeated until all of the history objects in the list for the output sub-band have been processed. Once all of the history objects in the list for the sub-band have been processed, the history manager 58 combines the aggregate profiles of the history objects in the sub-band to provide a combined aggregate profile for the sub-band, which is also referred to herein as a historical aggregate profile for the sub-band. More specifically, in this embodiment, the history manager 58 computes the historical aggregate profile for the sub-band as a weighted average of the aggregate profiles for the history objects in the sub-band using the relevancy weights of the history objects (step 1728). In one embodiment, the aggregate profiles for the history objects in the sub-band include the number of user matches, or number of occurrences, for each keyword, or interest, in the historical aggregate profiles. As such, the historical aggregate profile for the sub-band includes a weighted average of the number of user matches from the aggregate profiles generated for the historical objects relevant to the sub-band, which may be computed as:

$$user\_matches_{KEYWORD\_j,AVG} = \frac{\sum_{i=1}^{n}(relevancy_i \cdot number\_of\_user\_matches_{KEYWORD\_j,i})}{\sum_{i=1}^{n} relevancy_i},$$

where relevancy$_i$ is the relevancy weight computed in step 1722 for the i-th history object, number_of_user_matches$_{KEYWORD\_j,i}$ is the number of user matches for the j-th keyword for the i-th history object, and n is the number of history objects in the list for the sub-band. In addition or alternatively, the historical aggregate profile for the sub-band may include the weighted average of the ratio of the user matches to total users for each keyword, which may be computed as:

$$\frac{user\_matches}{total\_users_{KEYWORDj,AVG}} = \frac{\sum_{i=1}^{n}\left(relevancy_i \cdot \frac{number\_of\_user\_matches_{KEYWORD\_j,i}}{total\_users_i}\right)}{\sum_{i=1}^{n} relevancy_i},$$

where relevancy$_i$ is the relevancy weight computed in step 1722 for the i-th history object, number_of_user_matches$_{KEYWORD\_j,i}$ is the number of user matches for the j-th keyword for the i-th history object, total users$_i$ is the total number of users from the aggregate profile of the i-th history object, and n is the number of history objects in the list for the sub-band.

Next, the history manager 58 determines whether there are more sub-bands to process (step 1730). If so, the process returns to step 1718 and is repeated until the lists for all of the sub-bands have been processed. Once all of the sub-bands have been processed, the history manager 58 outputs the historical aggregate profiles for the sub-bands as historical aggregate profile data for the location and time period pair (step 1732).

FIG. 16 is a block diagram of the MAP server 12 according to one embodiment of the present disclosure. As illustrated, the MAP server 12 includes a controller 110 connected to memory 112, one or more secondary storage devices 114, and a communication interface 116 by a bus 118 or similar mechanism. The controller 110 is a microprocessor, digital Application Specific Integrated Circuit (ASIC), Field Programmable Gate Array (FPGA), or the like. In this embodiment, the controller 110 is a microprocessor, and the application layer 42, the business logic layer 44, and the object mapping layer 64 (FIG. 2) are implemented in software and stored in the memory 112 for execution by the controller 110. Further, the datastore 66 (FIG. 2) may be implemented in the one or more secondary storage devices 114. The secondary storage devices 114 are digital data storage devices such as, for example, one or more hard disk drives. The communication interface 116 is a wired or wireless communication interface that communicatively couples the MAP server 12 to the network 28 (FIGS. 1A and 1B). For example, the communication interface 116 may be an Ethernet interface, local wireless interface such as a wireless interface operating according to one of the suite of IEEE 802.11 standards, or the like.

FIG. 17 is a block diagram of the mobile device 18-1 according to one embodiment of the present disclosure. This discussion is equally applicable to the other mobile devices 18-2 through 18-N. As illustrated, the mobile device 18-1 includes a controller 120 connected to memory 122, a communication interface 124, one or more user interface components 126, and the location function 36-1 by a bus 128 or similar mechanism. The controller 120 is a microprocessor, digital ASIC, FPGA, or the like. In this embodiment, the controller 120 is a microprocessor, and the MAP client 30-1, the MAP application 32-1, and the third-party applications 34-1 are implemented in software and stored in the memory 122 for execution by the controller 120. In addition, if implemented on the mobile device 18-1, the profile creation function 40 is also preferably implemented in software and stored in the memory 122 for execution by the controller 120. In this embodiment, the location function 36-1 is a hardware component such as, for example, a GPS receiver. The communication interface 124 is a wireless communication interface that communicatively couples the mobile device 18-1 to the network 28 (FIGS. 1A and 1B). For example, the communication interface 124 may be a local wireless interface such as a wireless interface operating according to one of the suite of IEEE 802.11 standards, a mobile communications interface such as a cellular telecommunications interface, or the like. The one or more user interface components 126 include, for example, a touchscreen, a display, one or more user input components (e.g., a keypad), a speaker, or the like, or any combination thereof.

FIG. 18 is a block diagram of the subscriber device 22 according to one embodiment of the present disclosure. As illustrated, the subscriber device 22 includes a controller 130 connected to memory 132, one or more secondary storage devices 134, a communication interface 136, and one or more user interface components 138 by a bus 140 or similar mechanism. The controller 130 is a microprocessor, digital ASIC, FPGA, or the like. In this embodiment, the controller 130 is a microprocessor, and the web browser 38 (FIGS. 1A and 1B) is implemented in software and stored in the memory 132 for execution by the controller 130. In addition, if implemented on the subscriber device 22, the profile creation function 40 is also preferably implemented in software and stored in the memory 132 for execution by the controller 130. The one or more secondary storage devices 134 are digital storage devices such as, for example, one or more hard disk drives. The communication interface 136 is a wired or wireless communication interface that communicatively couples the subscriber device 22 to the network 28 (FIGS. 1A and 1B). For example, the communication interface 136 may be an Ethernet interface, local wireless interface such as a wireless interface operating according to one of the suite of IEEE 802.11 standards, a mobile communications interface such as a cellular telecommunications interface, or the like. The one or more user interface components 138 include, for example, a touchscreen, a display, one or more user input components (e.g., a keypad), a speaker, or the like, or any combination thereof.

FIG. 19 is a block diagram of the third-party server 26 according to one embodiment of the present disclosure. As illustrated, the third-party server 26 includes a controller 142 connected to memory 144, one or more secondary storage devices 146, a communication interface 148, and one or more user interface components 150 by a bus 152 or similar mechanism. The controller 142 is a microprocessor, digital ASIC, FPGA, or the like. In this embodiment, the controller 142 is a microprocessor, and one or more services provided by the third-party server 26 are implemented in software and stored in the memory 144 for execution by the controller 142. For instance, if implemented on the third-party server 26, the profile creation function 40 is also preferably implemented in software and stored in the memory 144 for execution by the controller 142. The one or more secondary storage devices 146 are digital storage devices such as, for example, one or more hard disk drives. The communication interface 148 is a wired or wireless communication interface that communicatively couples the third-party server 26 to the network 28 (FIGS. 1A and 1B). For example, the communication interface 148 may be an Ethernet interface, local wireless interface such as a wireless interface operating according to one of the suite of IEEE 802.11 standards, a mobile communications interface such as a cellular telecommunications interface, or the like. The one or more user interface components 150 include, for example, a touchscreen, a display, one or more user input components (e.g., a keypad), a speaker, or the like, or any combination thereof.

FIG. 20 is a block diagram of the profile server 14 according to one embodiment of the present disclosure. As illustrated, the profile server 14 includes a controller 154 connected to memory 156, one or more secondary storage devices 158, a communication interface 160, and one or more user interface components 162 by a bus 164 or similar mechanism. The controller 154 is a microprocessor, digital ASIC, FPGA, or the like. In this embodiment, the controller 154 is a microprocessor, and one or more services provided by the profile server 14 are implemented in software and stored in the memory 156 for execution by the controller 154. For instance, if implemented on the profile server 14, the profile creation function 40 is also preferably implemented in software and stored in the memory 156 for execution by the controller 154. The one or more secondary storage devices 158 are digital storage devices such as, for example, one or more hard disk drives. The communication interface 160 is a wired or wireless communication interface that communicatively couples the profile server 14 to the network 28 (FIGS. 1A and 1B). For example, the communication interface 160 may be an Ethernet interface, local wireless interface such as a wireless interface operating according to one of the suite of IEEE 802.11 standards, a mobile communications interface such as a cellular telecommunications interface, or the like. The one or more user interface components 162 include, for example, a touchscreen, a display, one or more user input components (e.g., a keypad), a speaker, or the like, or any combination thereof.

Those skilled in the art will recognize improvements and modifications to the preferred embodiments of the present invention. All such improvements and modifications are considered within the scope of the concepts disclosed herein and the claims that follow.

What is claimed is:
1. A computer-implemented method comprising:
determining one or more location and time period pairs for a subject user, each location and time period pair of the one or more location and time period pairs defining a previous location of the subject user and a time period during which the subject user was at the previous location;
obtaining historical aggregate profile data for the one or more location and time period pairs, wherein the historical aggregate profile data for the one or more location and time period pairs comprises, for each location and time period pair of the one or more location and time period pairs, a plurality of historical aggregate profiles for a corresponding plurality of sub-bands within the time period defined by the location and time period pair; and creating a user profile for the subject user based on the historical aggregate profile data for the one or more location and time period pairs, wherein creating the user profile comprises, for each location and time period pair of the one or more location and time period pairs:
  determining relevancy ratings for the plurality of sub-bands within the time period defined by the location and time period pair; and
  combining the plurality of historical aggregate profiles for the plurality of sub-bands within the time period defined by the location and time period pair based on the relevancy ratings for the plurality of sub-bands to provide a consolidated profile for the location and time period pair where the user profile is based on the consolidated profile, wherein combining the plurality of historical aggregate profiles for the plurality of sub-bands within the time period defined by the location and time period pair comprises, for each historical aggregate profile of the plurality of historical aggregate profiles:
    determining whether the relevancy rating for one of the plurality of sub-bands that corresponds to the historical aggregate profile is greater than or equal to a predefined cut-off value; and
    merging at least a subset of the historical aggregate profile into the consolidated profile for the location and time period pair when the relevancy rating is greater than or equal to the predefined cut-off value.

2. The method of claim 1 wherein determining the relevancy ratings for the plurality of sub-bands within the time period defined by the location and time period pair comprises determining the relevancy ratings of the plurality of sub-bands based on a manner in which the time period was defined.

3. The method of claim 1 wherein determining the relevancy ratings for the plurality of sub-bands within the time period defined by the location and time period pair comprises, for each sub-band of the plurality of sub-bands, determining the relevancy rating of the sub-band based on a degree of similarity between a corresponding one of the plurality of historical aggregate profiles and one or more user interests of the subject user.

4. The method of claim 1 wherein determining the relevancy ratings for the plurality of sub-bands within the time period defined by the location and time period pair comprises determining the relevancy ratings of the plurality of sub-bands based on a degree of similarity between additional information known about the location defined by the location and time period pair and one or more user interests of the subject user.

5. The method of claim 1 wherein determining the relevancy ratings for the plurality of sub-bands within the time period defined by the location and time period pair comprises determining the relevancy ratings of the plurality of sub-bands based on at least two of a group consisting of: a manner in which the time period was defined, a degree of similarity between each of the plurality of historical aggregate profiles and one or more user interests of the subject user, a degree of similarity between additional information known about the location defined by the location and time period pair and one or more user interests of the subject user, and whether the location and time period pair is similar to any other location and time period pairs from the one or more location and time period pairs.

6. The method of claim 1 wherein the predefined cut-off value is a function of a highest relevancy rating of the relevancy ratings of the plurality of sub-bands.

7. The method of claim 1 wherein merging the at least a subset of the historical aggregate profile into the consolidated profile for the location and time period pair comprises:
  merging the historical aggregate profile into the consolidated profile for the location and time period pair if the relevancy rating is greater than or equal to a predefined threshold value that is greater than the predefined cut-off value; and
  merging a subset of the historical aggregate profile into the consolidated profile for the location and time period pair if the relevancy rating is greater than or equal to the predefined cut-off value and less than the predefined threshold value.

8. The method of claim 7 wherein the predefined threshold value is half a difference between a maximum relevancy rating and the predefined cut-off value plus the predefined cut-off value.

9. The method of claim 7 wherein the subset of the historical aggregate profile merged into the consolidated profile is a subset of the historical aggregate profile related to one or more interests in the historical aggregate profile that are already included in the consolidated profile.

10. The method of claim 1 wherein creating the user profile for the subject user based on the historical aggregate profile data for the one or more location and time period pairs further comprises:
  processing the consolidated profiles provided for the one or more location and time period pairs to combine similar ones of the consolidated profiles and thereby provide one or more unique profiles.

11. The method of claim 10 wherein creating the user profile for the subject user based on the historical aggregate profile data for the one or more location and time period pairs further comprises automatically selecting one of the one or more unique profiles as the user profile of the subject user.

12. The method of claim 11 wherein automatically selecting the one of the one or more unique profiles as the user profile of the subject user comprises automatically selecting one of the one or more unique profiles that is most similar to an aggregate profile of a current crowd in which the subject user is located as the user profile of the subject user.

13. The method of claim 10 wherein creating the user profile for the subject user based on the historical aggregate profile data for the one or more location and time period pairs further comprises enabling the subject user to select one of the one or more unique profiles as the user profile of the subject user.

14. The method of claim 10 wherein creating the user profile for the subject user based on the historical aggregate profile data for the one or more location and time period pairs further comprises enabling the subject user to modify one of the one or more unique profiles to provide the user profile of the subject user.

15. The method of claim 10 wherein the one or more unique profiles includes a plurality of unique profiles, and creating the user profile for the subject user based on the historical aggregate profile data for the one or more location and time period pairs further comprises enabling the subject user to merge subsets of two or more of the one or more unique profiles to provide the user profile of the subject user.

16. The method of claim 1 wherein each historical aggregate profile of the plurality of historical aggregate profiles comprises a list of user interests and, for each user interest in the list of user interests, a number of occurrences for the user interest in user profiles of a plurality of users that contributed to the historical aggregate profile.

17. The method of claim 1 wherein each historical aggregate profile of the plurality of historical aggregate profiles comprises a list of user interests and, for each user interest in the list of user interests, a ratio of a number of occurrences for the user interest in user profiles of a plurality of users that contributed to the historical aggregate profile and a total number of users whose user profiles contributed to the historical aggregate profile.

18. The method of claim 1 wherein determining the one or more location and time period pairs for the subject user comprises:
    obtaining user information from the subject user that identifies one or more sources of previous locations of the subject user;
    obtaining information from the one or more sources that is indicative of one or more previous locations of the subject user and times at which the subject user was at the one or more previous locations; and
    processing the information from the one or more sources to determine the one or more location and time period pairs for the subject user.

19. The method of claim 18 wherein the one or more sources comprises at least one of a group consisting of a network service that operates to maintain a location history for a plurality of users including the subject user, one or more sources of a record of network accesses made by a mobile device of the subject user, a cellular telecommunications service provider that provides service to a mobile telecommunications device of the subject user, a source of a record of locations at which the subject user has conducted financial transactions, an electronic calendar of the subject user, and a source of geo-tagged content of the subject user.

20. The method of claim 1 wherein determining the one or more location and time period pairs for the subject user comprises receiving user input defining at least one of the one or more location and time period pairs from the subject user.

21. The method of claim 1 further comprising:
    obtaining one or more user interests of the subject user;
    wherein creating the user profile for the subject user comprises creating the user profile of the subject user based on the historical aggregate profile data for the one or more location and time period pairs and the one or more user interests of the subject user.

22. The method of claim 21 wherein obtaining the one or more user interests of the subject user comprises:
    obtaining user information from the subject user that identifies one or more sources of user interests of the subject user;
    obtaining information from the one or more sources that is representative of the one or more user interests of the subject user; and
    processing the information from the one or more sources to obtain the one or more user interests of the subject user.

23. The method of claim 22 wherein the one or more sources comprises at least one of a group consisting of: a social networking service and a website.

24. The method of claim 21 wherein obtaining the one or more user interests of the subject user comprises receiving user input defining at least one of the one or more user interests from the subject user.

25. A computing device comprising:
    a processor;
    memory;
    a communication interface; and
    a controller associated with the processor, the memory and the communication interface and configured to:
        determine one or more location and time period pairs for a subject user, each location and time period pair of the one or more location and time period pairs defining a previous location of the subject user and a time period during which the subject user was at the previous location;
        obtain historical aggregate profile data for the one or more location and time period pairs, wherein the historical aggregate profile data for the one or more location and time period pairs comprises, for each location and time period pair of the one or more location and time period pairs, a plurality of historical aggregate profiles for a corresponding plurality of sub-bands within the time period defined by the location and time period pair; and
        create a user profile for the subject user based on the historical aggregate profile data for the one or more location and time period pairs, wherein when creating the user profile the controller is further configured to, for each location and time period pair of the one or more location and time period pairs:
            determine relevancy ratings for the plurality of sub-bands within the time period defined by the location and time period pair; and
            combine the plurality of historical aggregate profiles for the plurality of sub-bands within the time period defined by the location and time period pair based on the relevancy ratings for the plurality of sub-bands to provide a consolidated profile for the location and time period pair where the user profile is based on the consolidated profile, wherein to combine the plurality of historical aggregate profiles for the plurality of sub-bands within the time period defined by the location and time period pair comprises, for each historical aggregate profile of the plurality of historical aggregate profiles the controller is configured to:
                determine whether the relevancy rating for one of the plurality of sub-bands that corresponds to the historical aggregate profile is greater than or equal to a predefined cut-off value; and
                merge at least a subset of the historical aggregate profile into the consolidated profile for the location and time period pair when the relevancy rating is greater than or equal to the predefined cut-off value.

26. A non-transitory computer-readable storage medium storing software for instructing a controller of a computing device to:
    determine one or more location and time period pairs for a subject user, each location and time period pair of the one or more location and time period pairs defining a previous location of the subject user and a time period during which the subject user was at the previous location;
    obtain historical aggregate profile data for the one or more location and time period pairs, wherein the historical aggregate profile data for the one or more location and time period pairs comprises, for each location and time period pair of the one or more location and time period pairs, a plurality of historical aggregate profiles for a corresponding plurality of sub-bands within the time period defined by the location and time period pair; and
    create a user profile for the subject user based on the historical aggregate profile data for the one or more location and time period pairs, wherein when creating the user profile the software instructs the controller of the computing device to, for each location and time period pair of the one or more location and time period pairs:
determine relevancy ratings for the plurality of sub-bands within the time period defined by the location and time period pair; and
combine the plurality of historical aggregate profiles for the plurality of sub-bands within the time period defined by the location and time period pair based on the relevancy ratings for the plurality of sub-bands to provide a consolidated profile for the location and time period pair where the user profile is based on the consolidated profile, wherein to combine the plurality of historical aggregate profiles for the plurality of sub-bands within the time period defined by the location and time period pair comprises, for each historical aggregate profile of the plurality of historical aggregate profiles the software for instructing the controller to:
determine whether the relevancy rating for one of the plurality of sub-bands that corresponds to the historical aggregate profile is greater than or equal to a predefined cut-off value; and
merge at least a subset of the historical aggregate profile into the consolidated profile for the location and time period pair when the relevancy rating is greater than or equal to the predefined cut-off value.

* * * * *